United States Patent
Kobayashi et al.

(10) Patent No.: US 12,403,628 B2
(45) Date of Patent: Sep. 2, 2025

(54) KNEADING METHOD FOR USE WITH KNEADING APPARATUS WITH FIRST AND SECOND EXTRUDERS

(71) Applicants: SHIBAURA MACHINE CO., LTD., Tokyo (JP); HSP Technologies Inc., Ibaraki (JP)

(72) Inventors: Akiyoshi Kobayashi, Tokyo (JP); Shigeyuki Fujii, Numazu (JP); Takafumi Sameshima, Mishima (JP); Hiroshi Shimizu, Tsukuba (JP)

(73) Assignees: SHIBAURA MACHINE CO., LTD., Tokyo (JP); HSP Technologies Inc., Ibaraki (JP)

( * ) Notice: Subject to any disclaimer, the term of this patent is extended or adjusted under 35 U.S.C. 154(b) by 0 days.

(21) Appl. No.: 18/068,753

(22) Filed: Dec. 20, 2022

(65) Prior Publication Data
US 2023/0125116 A1    Apr. 27, 2023

Related U.S. Application Data

(60) Division of application No. 15/345,711, filed on Nov. 8, 2016, now Pat. No. 11,565,440, which is a
(Continued)

(30) Foreign Application Priority Data

May 8, 2014 (JP) .................................. 2014-096800
Apr. 17, 2015 (JP) .................................. 2015-085231

(51) Int. Cl.
*B29B 7/42* (2006.01)
*B29B 7/48* (2006.01)
(Continued)

(52) U.S. Cl.
CPC .............. *B29B 7/426* (2013.01); *B29B 7/429* (2013.01); *B29B 7/48* (2013.01); *B29B 7/483* (2013.01);
(Continued)

(58) Field of Classification Search
CPC ........... B29B 7/489; B29B 7/847; B29B 7/82; B29B 7/90; B29B 7/845; B29B 7/42;
(Continued)

(56) References Cited

U.S. PATENT DOCUMENTS 3,305,894 A * 2/1967 Pfaff ..................... B29C 48/268
366/85
3,371,379 A * 3/1968 Reifenhauser ............ B29B 7/86
366/75
(Continued)

FOREIGN PATENT DOCUMENTS

CN        87102748       11/1987
CN        101973121       2/2011
(Continued)

OTHER PUBLICATIONS

U.S. Appl. No. 17/386,635, filed Sep. 28, 2023.
(Continued)

*Primary Examiner* — Charles Cooley
(74) *Attorney, Agent, or Firm* — DLA Piper LLP (US)

(57) ABSTRACT

A kneading apparatus includes a processor and an extruder. The extruder includes a screw. The screw includes a screw main body. A conveyance portion, a barrier portion, and a path are provided at places of the screw main body. In at least one of the places, the path is provided inside the screw main body and includes an entrance and an exit. The raw materials, pressure on which is increased by the barrier portion, flow in from the entrance. The raw materials flowing in from the entrance flow through the path toward the
(Continued)

exit. The exit is positioned to be remote from the entrance in an axial direction. A method of using the kneading apparatus includes continuously melting and mixing materials in the processor, using the melted materials as the raw materials, and continuously discharging kneaded materials produced by kneading the raw materials with the screw in the extruder.

2 Claims, 23 Drawing Sheets

Related U.S. Application Data continuation of application No. PCT/JP2015/062549, filed on Apr. 24, 2015.

(51) Int. Cl.

| | | |
|---|---|---|
| *B29B 7/74* | (2006.01) | |
| *B29B 7/82* | (2006.01) | |
| *B29B 7/84* | (2006.01) | |
| *B29C 48/385* | (2019.01) | |
| *B29C 48/40* | (2019.01) | |
| *B29C 48/51* | (2019.01) | |
| *B29C 48/515* | (2019.01) | |
| *B29C 48/57* | (2019.01) | |
| *B29C 48/67* | (2019.01) | |
| *B29C 48/76* | (2019.01) | |

(52) U.S. Cl.
CPC ............. *B29B 7/487* (2013.01); *B29B 7/489* (2013.01); *B29B 7/7461* (2013.01); *B29B 7/7485* (2013.01); *B29B 7/82* (2013.01); *B29B 7/84* (2013.01); *B29B 7/845* (2013.01); *B29C 48/385* (2019.02); *B29C 48/40* (2019.02); *B29C 48/402* (2019.02); *B29C 48/51* (2019.02); *B29C 48/515* (2019.02); *B29C 48/57* (2019.02); *B29C 48/67* (2019.02); *B29C 48/76* (2019.02); *B29C 48/767* (2019.02)

(58) Field of Classification Search
CPC ....... B29B 7/421; B29B 7/823; B29B 7/7485; B29B 7/7461; B29B 7/429; B29B 7/482; B29B 7/422; B29B 7/726; B29B 7/426; B29B 7/48; B29B 7/483; B29B 7/487; B29B 7/84; B29B 7/38; B29C 47/402; B29C 47/6018; B29C 47/622; B29C 47/6056; B29C 47/6012; B29C 48/82; B29C 48/802; B29C 48/625; B29C 48/385; B29C 48/535; B29C 48/55; B29C 48/54; B29C 48/72; B29C 48/402; B29C 48/74; B29C 48/745; B29C 48/725; B29C 48/375; B29C 48/40; B29C 48/51; B29C 48/515; B29C 48/57; B29C 48/67; B29C 48/76; B29C 48/767; B29K 2105/251; B29K 2023/12; B29K 2509/00
USPC ................. 425/200–209; 366/79–91, 290, 75
See application file for complete search history.

(56) References Cited

U.S. PATENT DOCUMENTS

| | | | | |
|---|---|---|---|---|
| 3,503,944 A * | 3/1970 | Mohr | .................... | B29C 48/022 |
| | | | | 422/135 |
| 3,712,594 A * | 1/1973 | Schippers | ............. | B29C 48/766 |
| | | | | 366/89 |
| 3,746,318 A | 7/1973 | Schippers | | |
| 3,799,234 A * | 3/1974 | Skidmore | ................ | B29B 7/484 |
| | | | | 528/502 F |
| 3,924,842 A * | 12/1975 | Klein | .................... | B29C 48/725 |
| | | | | 366/318 |
| 3,963,558 A * | 6/1976 | Skidmore | ............... | B29C 48/76 |
| | | | | 264/102 |
| 3,999,921 A * | 12/1976 | Thor | ......................... | B29B 7/42 |
| | | | | 366/76.9 |
| 4,118,163 A * | 10/1978 | Lee | .......................... | B29B 7/726 |
| | | | | 425/208 |
| 4,169,679 A | 10/1979 | Miller et al. | | |
| 4,290,702 A * | 9/1981 | Klein | ..................... | B29B 7/429 |
| | | | | 366/77 |
| 4,302,409 A | 11/1981 | Miller et al. | | |
| 4,329,313 A | 5/1982 | Miller et al. | | |
| 4,387,997 A * | 6/1983 | Klein | .................... | B29C 48/395 |
| | | | | 425/208 |
| 4,423,960 A * | 1/1984 | Anders | ................... | B29C 48/40 |
| | | | | 366/85 |
| 4,472,059 A * | 9/1984 | Klein | .................... | B29C 48/395 |
| | | | | 366/293 |
| 4,600,311 A * | 7/1986 | Mourrier | .............. | B29C 48/505 |
| | | | | 366/322 |
| 4,637,790 A * | 1/1987 | Klein | ..................... | B29C 48/51 |
| | | | | 425/208 |
| 4,802,140 A * | 1/1989 | Dowling | ................ | B29C 48/51 |
| | | | | 366/144 |
| 4,902,455 A * | 2/1990 | Wobbe | .................... | B29B 7/726 |
| | | | | 264/102 |
| 4,983,114 A * | 1/1991 | Hauck | .................... | B29C 48/40 |
| | | | | 366/85 |
| 5,098,267 A * | 3/1992 | Cheng | ................. | B29C 44/3449 |
| | | | | 366/76.9 |
| 5,102,594 A * | 4/1992 | Burlet | ................... | B29C 48/285 |
| | | | | 264/101 |
| 5,358,681 A | 10/1994 | Jerman et al. | | |
| 5,797,677 A * | 8/1998 | Weihrich | ............ | B29C 48/2564 |
| | | | | 366/85 |
| 5,804,111 A * | 9/1998 | Kobayashi | ............. | B29C 48/57 |
| | | | | 425/149 |
| 6,024,479 A * | 2/2000 | Haring | .................. | B29C 48/767 |
| | | | | 366/85 |
| 8,048,948 B2 | 11/2011 | Shimizu et al. | | |
| 8,975,336 B2 | 3/2015 | Shimizu et al. | | |
| 9,199,393 B2 * | 12/2015 | Shimizu | .................... | B29B 7/28 |
| 10,967,554 B2 * | 4/2021 | Kobayashi | ............. | B29B 7/483 |
| 11,072,104 B2 * | 7/2021 | Kobayashi | ............. | B29B 7/845 |
| 11,110,638 B2 * | 9/2021 | Kobayashi | ............. | B29C 48/57 |
| 11,220,022 B2 * | 1/2022 | Kobayashi | ............ | B29C 48/535 |
| 11,224,991 B2 * | 1/2022 | Kobayashi | ............ | B29B 7/7485 |
| 11,229,889 B2 * | 1/2022 | Kobayashi | .......... | B29C 48/2564 |
| 11,230,033 B2 * | 1/2022 | Kobayashi | ................ | B29B 7/42 |
| 11,260,468 B2 * | 3/2022 | Frank | ..................... | B23K 20/00 |
| 11,400,632 B2 * | 8/2022 | Kobayashi | ............. | B29B 7/726 |
| 11,400,633 B2 * | 8/2022 | Kobayashi | ............. | B29B 7/487 |
| 11,565,440 B2 * | 1/2023 | Kobayashi | ............. | B29C 48/515 |
| 2004/0222543 A1 | 11/2004 | Innerebner et al. | | |
| 2005/0087904 A1 * | 4/2005 | Bryan | ..................... | B29B 7/487 |
| | | | | 264/148 |
| 2006/0108706 A1 * | 5/2006 | Galimberti | ............ | B29C 48/297 |
| | | | | 264/211.23 |
| 2016/0303766 A1 | 10/2016 | Kobayashi | | |
| 2016/0332331 A1 * | 11/2016 | Kobayashi | ............ | B29B 7/7485 |
| 2016/0332332 A1 * | 11/2016 | Kobayashi | ................ | B29B 7/42 |
| 2017/0021547 A1 * | 1/2017 | Kobayashi | ............ | B29C 48/298 |
| 2017/0050366 A1 * | 2/2017 | Kobayashi | ............ | B29C 48/767 |
| 2017/0050367 A1 * | 2/2017 | Kobayashi | ............. | B29B 7/483 |
| 2017/0113394 A1 * | 4/2017 | Kobayashi | ............. | B29B 7/7461 |
| 2017/0225360 A1 * | 8/2017 | Kobayashi | ............. | B29B 7/489 |
| 2017/0225379 A1 * | 8/2017 | Kobayashi | ............. | B29C 48/49 |
| 2018/0093233 A1 * | 4/2018 | Kobayashi | ............. | B29C 48/507 |
| 2018/0093234 A1 * | 4/2018 | Kobayashi | ............. | B29B 7/483 |
| 2019/0352472 A1 * | 11/2019 | Sameshima | ........... | B29C 48/022 |
| 2020/0282622 A1 | 9/2020 | Ougier | | |
| 2021/0154906 A1 * | 5/2021 | Kobayashi | ............. | B29B 7/7461 |
| 2021/0316492 A1 * | 10/2021 | Kobayashi | ............. | B29B 7/845 |
| 2021/0354362 A1 * | 11/2021 | Kobayashi | ............. | B29C 48/288 |
| 2021/0362374 A1 * | 11/2021 | Sameshima | ............. | B29B 7/48 |
| 2022/0305704 A1 * | 9/2022 | Sameshima | ............. | B29C 48/51 |

(56) References Cited

U.S. PATENT DOCUMENTS

2022/0325455 A1* 10/2022 Sasai ............... D04H 1/4291
2023/0091065 A1* 3/2023 Chastek ............ B29C 48/252
2024/0033974 A1* 2/2024 Sasai ............... B29B 7/90

FOREIGN PATENT DOCUMENTS

| | | | |
|---|---|---|---|
| DE | 25 48 490 | | 5/1977 |
| DE | 27 58 265 C2 | | 12/1982 |
| DE | 43 19 058 A1 | | 12/1994 |
| DE | 69417466 | | 12/1999 |
| EP | 0 688 600 | | 12/1995 |
| EP | 2 578 378 | | 4/2013 |
| EP | 3650196 | | 5/2020 |
| EP | 3650196 A1 | * | 5/2020 |
| GB | 1 501 412 | | 2/1978 |
| JP | 52-72573 | * | 5/1977 |
| JP | S52-72573 | | 5/1977 |
| JP | 56-037054 | | 8/1981 |
| JP | 57-107826 | | 7/1982 |
| JP | 59-184635 | | 10/1984 |
| JP | H04-044826 | | 2/1992 |
| JP | 5-220818 | | 8/1993 |
| JP | 07-088923 | | 4/1995 |
| JP | 2005-169764 | | 6/2005 |
| JP | 2010-069771 | | 4/2010 |
| JP | 2011-046104 | | 3/2011 |
| JP | 2012-051289 | | 3/2012 |
| KR | 10-2010-0087738 | | 8/2010 |
| SU | 889462 | | 12/1981 |
| SU | 996222 | | 2/1983 |
| WO | WO 2010/061872 | | 6/2010 |
| WO | WO 2013-133453 | | 9/2013 |
| WO | WO 2015/163197 | | 10/2015 |
| WO | WO 2015/170617 | | 11/2015 |
| WO | WO 2020-025446 | | 2/2020 |

OTHER PUBLICATIONS

Japanese Office Action in JP Application No. 2015-082775 dated May 7, 2019.
German Office Action issued in DE Application No. 11 2015 002 161.2 dated Aug. 8, 2019.
International Search Report issued in International Application No. PCT/JP2015/060641 dated May 26, 2015.
International Search Report issued in International Application No. PCT/JP2015/061487 dated Jul. 7, 2015.
International Search Report issued in International Application No. PCT/JP2016/062278 dated Jul. 12, 2016.
International Search Report issued in International Application No. PCT/JP2016/062279 dated Jul. 12, 2016.
Written Opinion issued in International Application No. PCT/JP2015/060641 dated May 26, 2015.
Written Opinion issued in International Application No. PCT/JP2015/061487 dated Jul. 7, 2015.
Written Opinion issued in International Application No. PCT/JP2016/062278 dated Jul. 12, 2016.
Written Opinion issued in International Application No. PCT/JP2016/062279 dated Jul. 12, 2016.
Taiwan Office Action issued in Taiwan Application No. 104112230 dated Sep. 2, 2016.
Taiwan Office Action issued in Taiwan Application No. 104112709 dated Sep. 2, 2016.
Chinese Office Action issued in Chinese Application No. 201580007088.2 dated Mar. 3, 2017.
Chinese Office Action issued in Chinese Application No. 201580007825.9 dated Mar. 24, 2017.
Korean Office Action issued in KR 10-2016-7021148 dated Nov. 29, 2017.
English Language Abstract of JP 7-227836 published Aug. 29, 1995.
English Language Abstract of JP 2010-137405 published Jun. 24, 2010.
English Language Abstract of JP 2013-123841 published Jun. 24, 2013.
English Language Abstract of JP 2005-169764 published Jun. 30, 2005.
English Language Abstract of JP 57-041932 published Mar. 9, 1982.
English Language Abstract of KR 10-2010-0087738 published Aug. 5, 2010.
Office Action in CN Application No. 201680024052X dated Jul. 22, 2019.
Office Action in DE Application No. 112015001938.3 dated Jul. 26, 2019.
U.S. Appl. No. 15/221,293, filed Jul. 7, 2023.
U.S. Appl. No. 15/221,277, filed Jul. 7, 2023.
U.S. Appl. No. 15/795,534, filed Jul. 7, 2023.
U.S. Appl. No. 15/795,535, filed Jul. 7, 2023.
U.S. Appl. No. 15/345,750, filed Jul. 7, 2023.
U.S. Appl. No. 15/345,758, filed Jul. 7, 2023.
U.S. Appl. No. 17/166,781, filed Feb. 3, 2021 filed Jul. 7, 2023.
German Office Action in DE Application No. 11 2015 002 157.4, dated Sep. 27, 2021.
U.S. Appl. No. 15/345,711, filed Jul. 7, 2023.
U.S. Appl. No. 17/386,635, filed Jul. 7, 2023.
Office Action in German Application No. 112015002157.4, dated Aug. 13, 2024.

* cited by examiner

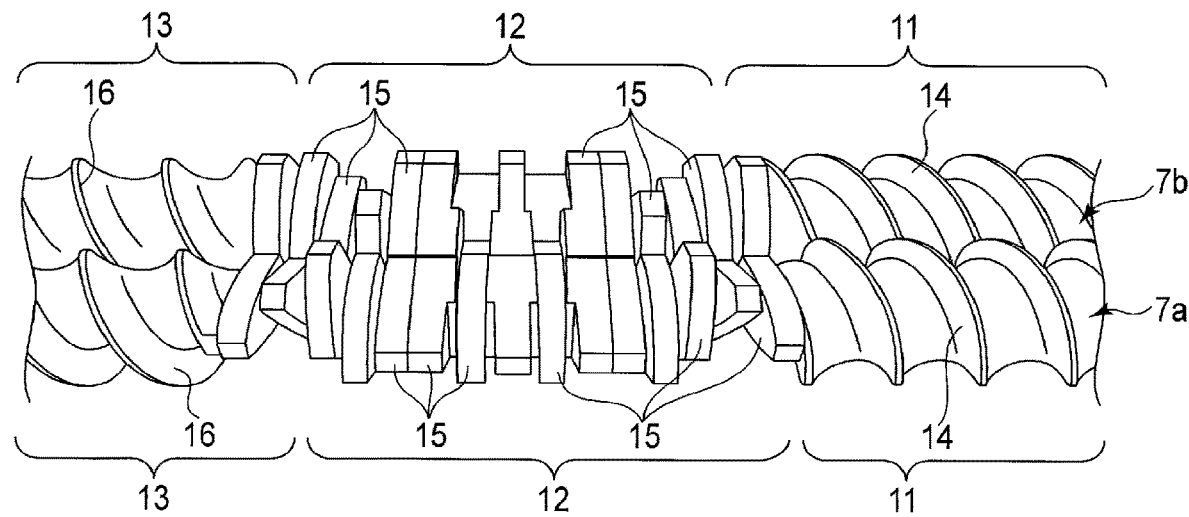
F I G. 3
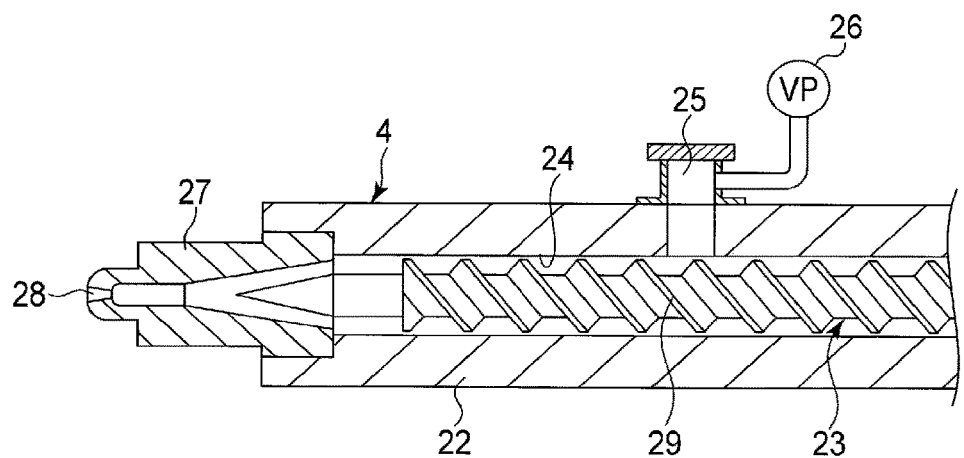
F I G. 4

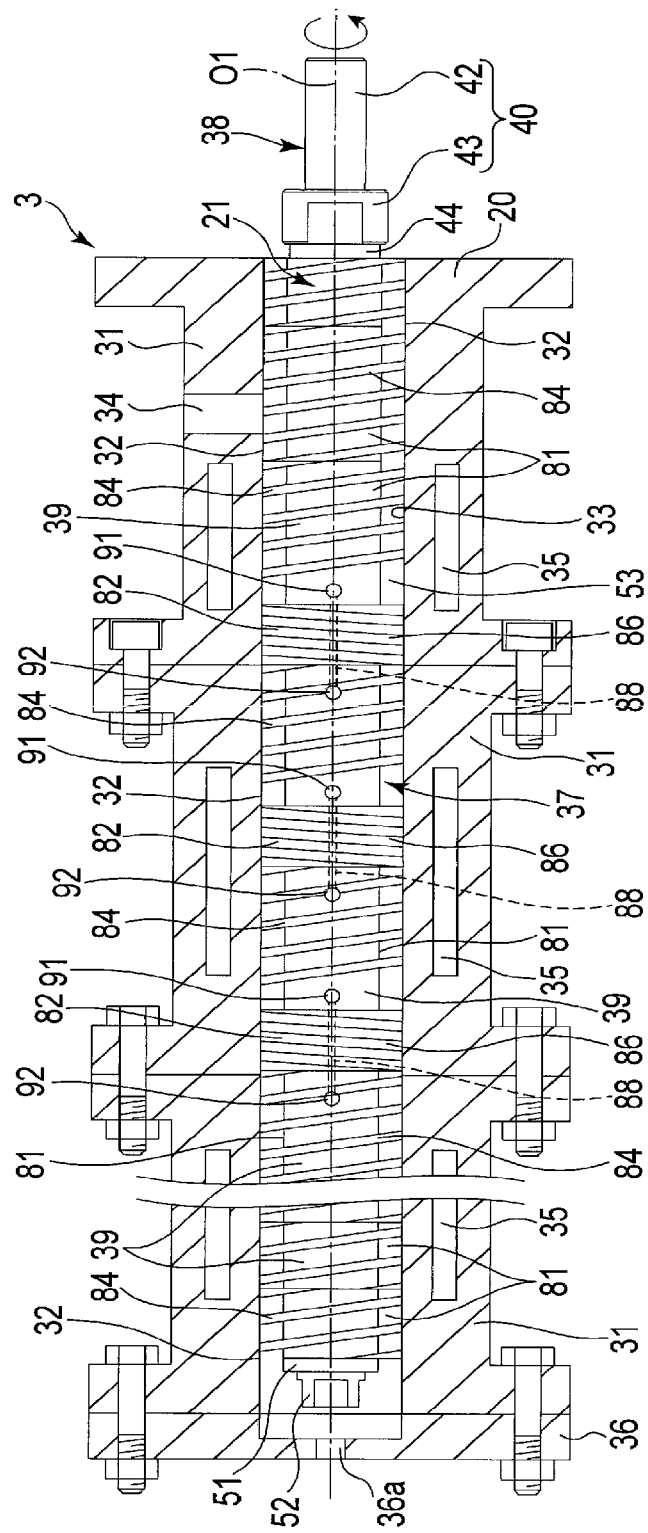
F I G. 13

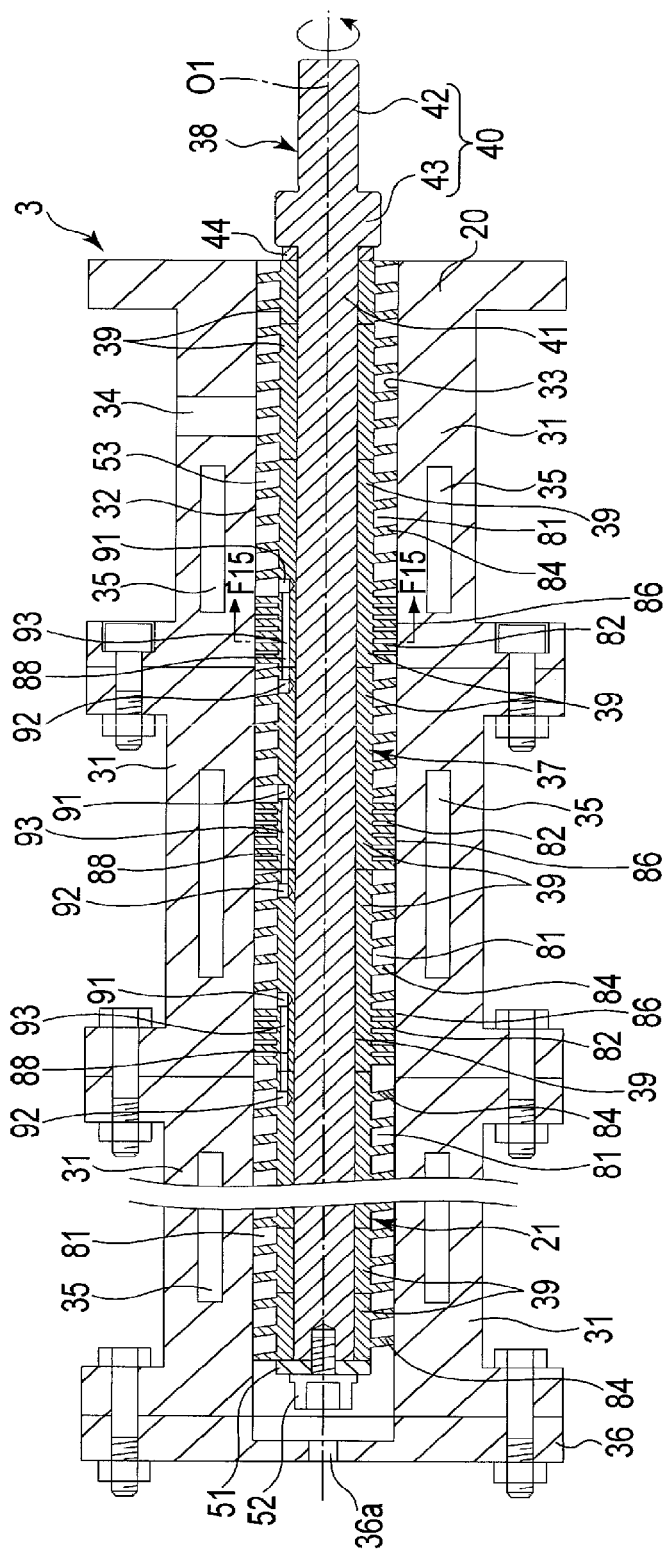
F I G. 14

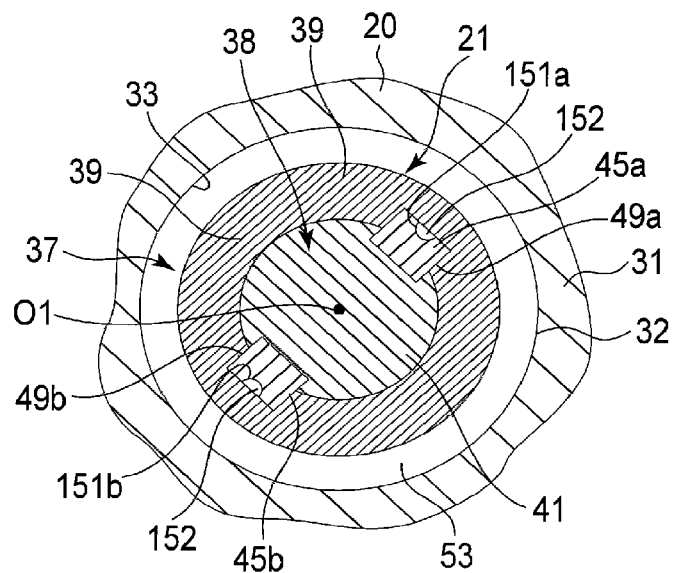
F I G. 31
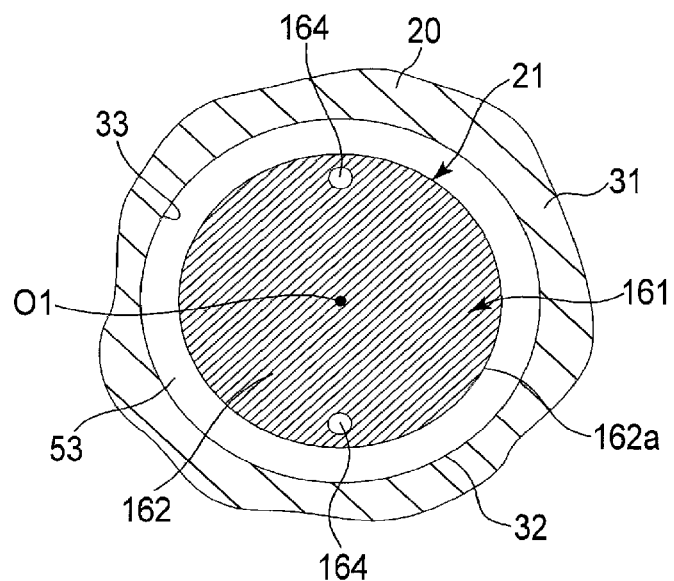
F I G. 32

KNEADING METHOD FOR USE WITH KNEADING APPARATUS WITH FIRST AND SECOND EXTRUDERS

CROSS REFERENCE TO RELATED APPLICATIONS

This application is a Divisional application of U.S. patent application Ser. No. 15/345,711, filed Nov. 8, 2016, and a Continuation Application of PCT Application No. PCT/JP2015/062549, filed Apr. 24, 2015 and based upon and claiming the benefit of priority from prior Japanese Patent Applications No. 2014-096800, filed May 8, 2014; and No. 2015-085231, filed Apr. 17, 2015, the entire contents of all of which are incorporated herein by reference.

BACKGROUND OF THE INVENTION

1. Field of the Invention

The present invention relates to a kneading apparatus comprising an extruder which kneads blended raw materials while imparting shearing action and extension action to them, and a kneading method thereof.

2. Description of the Related Art

For example, if raw materials obtained by blending incompatible resins are kneaded by an extruder wherein the rotational rate of a screw is set at approximately 300 rpm, it is necessary to add a compatibilizer having affinity for or adhesive properties to one or both of the blended components. However, even if the compatibilizer is used, the blended components are not mutually melted at a molecular level. Thus, naturally, there is a limit on the improvement in the capabilities and the functions of kneaded materials produced by the extruder.

To solve such a problem, there has been conventionally developed a high shearing and forming apparatus capable of producing kneaded materials having a microscopic structure in which if one macromolecular component is formed into a matrix, the dispersed phase size of the other macromolecular component is controlled to a diameter of 300 nm or less, or a structure in which both the macromolecular components are microscopically connected to each other, without using any additives such as a compatibilizer.

The high shearing and forming apparatus disclosed in Patent Literature 1 comprises a feedback-type screw accommodated in a cylinder. The screw has a structure in which raw materials obtained by blending incompatible resins are sufficiently kneaded inside the screw.

Specifically, the screw has a straight axial line in the conveyance direction of the raw materials, and is configured to rotate on the axial line inside the cylinder. A spiral flight which conveys raw materials supplied from one end portion of the screw in the axial direction of the screw is formed on the outer circumferential surface of the screw. The raw materials conveyed by the flight are trapped in a gap between a tip surface of the screw and a sealing member closing an opening end of the cylinder. Moreover, the screw has a hole having an inside diameter of approximately 1 to 5 mm substantially at its central portion. The hole extends in the axial-line direction of the screw. An upstream end of the hole is opened in the gap in the tip surface of the screw. A downstream end of the hole branches bifurcately, and is opened in the outer circumferential surface of the one end portion of the screw.

Thus, the raw materials trapped in the gap flow into the hole from the upstream end of the hole with the rotation of the screw, and are returned to the outer circumferential surface of the one end portion of the screw from the downstream end of the hole. The returned raw materials are conveyed again toward the gap by the flight.

In this manner, by using the feedback-type screw, raw materials supplied to the screw are subjected to shearing action in the process of being conveyed by the flight and subjected to extension action in the process of passing through the hole. As a result, the degree of kneading of raw materials is increased by high shearing. Thus, macromolecular components of the raw materials are dispersed at a nanolevel, and kneaded materials having a microscopic dispersion structure can be obtained.

CITATION LIST

Patent Literature

Patent Literature 1
   WO 2010/061872 A
Patent Literature 2
   JP 2011-020341 A

BRIEF SUMMARY OF THE INVENTION

Technical Problem

Incidentally, the apparatus of Patent Literature 1 repeats a circulation process of feeding raw materials supplied to the cylinder from a rear end of the screw to a gap in a front end, and then returning them from the gap to the rear end of the screw. However, in the circulation process, the next kneading is performed after a particular amount of raw materials is circulated and kneaded and the kneaded materials are discharged. Accordingly, a particular amount or more of kneaded materials cannot be continuously discharged.

Moreover, Patent Literature 2 discloses a kneader comprising a kneading portion which kneads a particular amount of materials to be kneaded, and a buffer portion in which the fluid of kneaded materials is collected. A particular amount of kneaded fluid is supplied from the kneading portion to the buffer portion, and collected. The collected fluid is continuously discharged from the buffer portion.

In the kneader of Patent Literature 2, in a state in which a predetermined amount of the fluid of kneaded materials is collected in advance in the buffer portion, the discharge of the fluid from the buffer portion is controlled so that the collected fluid is not depleted. That is, the amount of fluid discharged from the buffer portion is limited. Thus, the fluid is continuously discharged within the range of the residual amount of fluid currently collected in the buffer portion until fluid is next supplied from the kneading portion.

However, the discharge control of Patent Literature 2 is exercised to temporarily collect the fluid intermittently supplied from the kneading portion in the buffer portion, and then discharge the fluid in a regular small amount within the range of the collected amount, not to continuously convey the fluid in the process of being kneaded and discharged. In other words, the discharge control of Patent Literature 2 is merely exercised as if the fluid were continuously discharged. Because a process whereby the fluid stagnates in the process of being kneaded and discharged is essential, the fluid cannot be completely continuously produced. As a result, the kneader of Patent Literature 2 cannot continuously discharge a particular amount or more of fluid.

Moreover, in the kneader of Patent Literature 2, the fluid of kneaded materials is temporarily collected in the buffer portion. Thus, the physical properties of the fluid collected in the buffer portion may change depending on the length of time it spends in the buffer portion.

To maintain uniform quality, it is required that continuously discharged fluid has the same physical properties over its total length or whole. Nevertheless, if fluid whose physical properties have changed is mixed, portions of different physical properties exist in the fluid. Thus, the quality of the fluid to be discharged cannot be uniformly maintained.

Accordingly, an object of the present invention is to provide to a kneading technique of continuously conveying processing objects without their stagnating in all the processes including a melt process for materials, a kneading process in which melted materials are used as raw materials, and a discharge process for produced kneaded materials, and thereby enabling completely continuous production of kneaded materials having uniform quality.

Solution to Problem

In general, according to one embodiment, a kneading apparatus includes a processor, and a extruder. The extruder includes a screw. The screw includes a screw main body. A conveyance portion, a barrier portion, and a path are provided at places of the screw main body. In at least one of the places, the path is provided inside the screw main body, and includes an entrance and an exit. The raw materials, pressure on which is increased by the barrier portion, flow in from the entrance. The raw materials flowing in from the entrance flow through the path toward the exit. The exit is positioned to be remote from the entrance in an axial direction.

In general, according to one embodiment, a kneading method comprising: continuously melting and mixing materials in a processor; and using the melted materials as raw materials and continuously discharging kneaded materials produced by kneading the raw materials with a screw in an extruder, the screw comprising a screw main body configured to rotate on a straight axial line in a conveyance direction of the raw materials, a path through which the raw materials flow being provided inside the screw main body, wherein in the extruder, the raw materials conveyed along an outer circumferential surface of the screw main body flow through the path and then return to an outer circumferential surface of the screw, while the kneaded materials are continuously discharged.

Advantageous Effects of Invention

According to the present invention, a kneading technique of continuously conveying processing objects without their stagnating in all the processes including a melt process for materials, a kneading process in which melted materials are used as raw materials, and a discharge process for produced kneaded materials, and thereby enabling completely continuous production of kneaded materials having uniform quality.

BRIEF DESCRIPTION OF THE SEVERAL VIEWS OF THE DRAWING

FIG. 3 is a perspective view showing a state in which two screws of the first extruder engage with each other in the first embodiment.

FIG. 4 is a sectional view of a third extruder used in the first embodiment.

FIG. 13 is a sectional view of a second extruder used in a third embodiment.

FIG. 14 is a sectional view of the second extruder sectionally showing both a barrel and a screw in the third embodiment.

FIG. 31 is a sectional view of a second extruder according to an eighth embodiment.

FIG. 32 is a sectional view of a second extruder according to a ninth embodiment.

DETAILED DESCRIPTION OF THE INVENTION

First Embodiment

A first embodiment will be described hereinafter with reference to FIG. 1 to FIG. 11.

Figure 1:
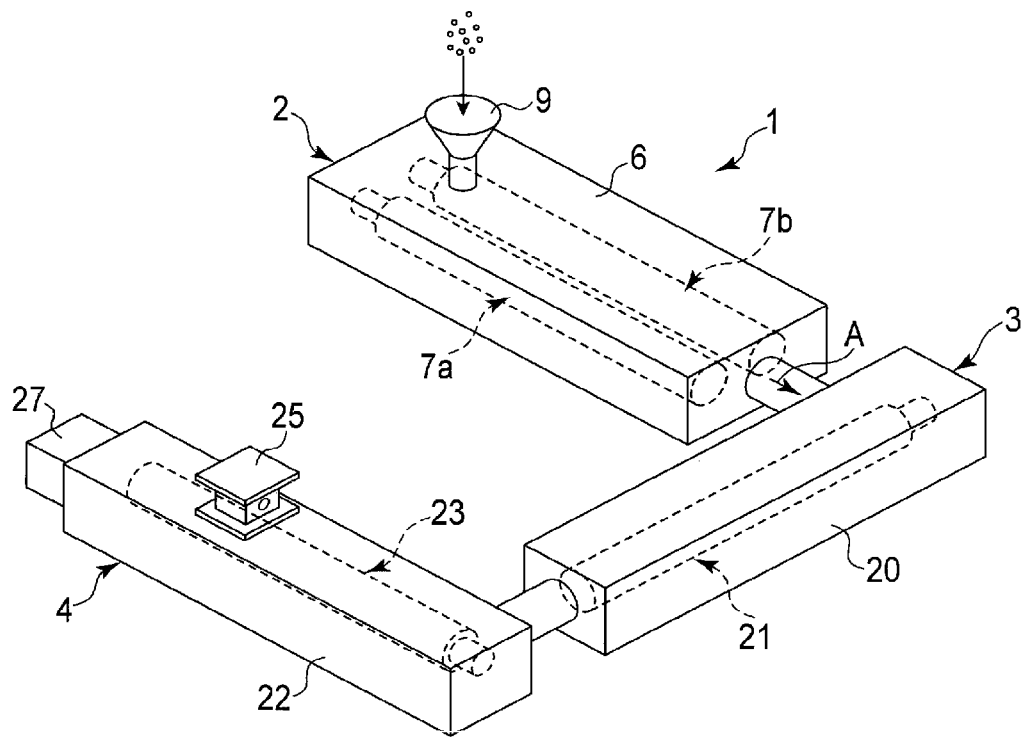
FIG. 1 is a perspective view schematically showing a continuous high shearing processing apparatus (kneading apparatus) according to a first embodiment.

FIG. 1 schematically shows a structure of a continuous high shearing processing apparatus (kneading apparatus) 1 according to the first embodiment. The high shearing processing apparatus 1 comprises a first extruder (processor) 2, a second extruder 3, and a third extruder (deaerator) 4. The first extruder 2, the second extruder 3, and the third extruder 4 are connected to each other in series.

The first extruder 2 is a processor for preliminarily kneading and melting materials, for example, two kinds of incompatible resin. Here, a polycarbonate (PC) resin and a polymethyl methacrylate (PMMA) resin are applied as the two kinds of resin. These resins are supplied to the first extruder 2, for example, in a state of pellets.

Figure 2:
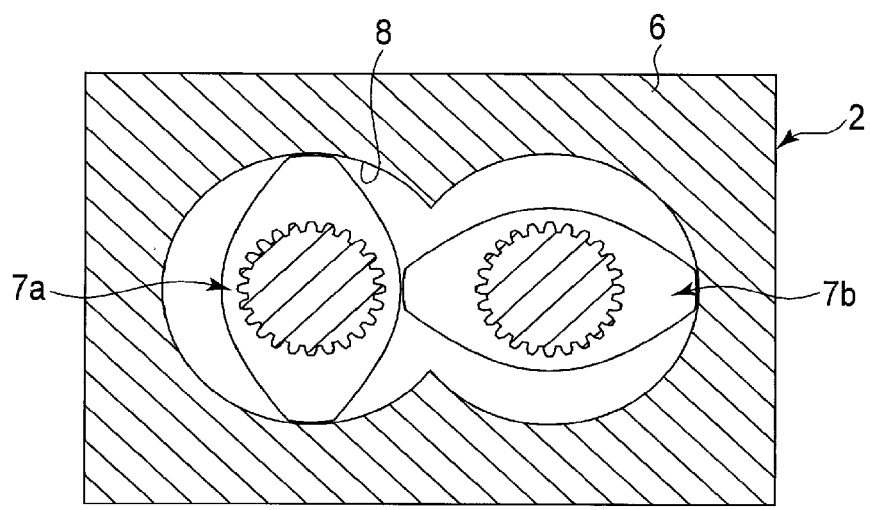
FIG. 2 is a sectional view of a first extruder used in the first embodiment.

In the present embodiment, a corotating twin screw kneader is used as the first extruder 2 to increase the degree of kneading and melting of the resins. FIG. 2 and FIG. 3 show an example of the twin screw kneader. The twin screw kneader comprises a barrel 6 and two screws 7a and 7b accommodated inside the barrel 6. The barrel 6 includes a cylinder portion 8 having the shape of a combination of two cylinders. The resins are continuously supplied to the cylinder portion 8 from a supply port 9 provided at one end portion of the barrel 6. Moreover, the barrel 6 contains a heater for melting the resins.

The screws 7a and 7b are accommodated in the cylinder portion 8 in a state of engaging with each other. The screws 7a and 7b are rotated in the same direction upon receipt of torque transmitted from a motor not shown in the figures. As shown in FIG. 3, the screws 7a and 7b each comprise a feed portion 11, a kneading portion 12, and a pumping portion 13. The feed portion 11, the kneading portion 12, and the pumping portion 13 are arranged in a line in the axial direction of the screws 7a and 7b.

The feed portion 11 comprises a spirally twisted flight 14. The flights 14 of the screws 7a and 7b rotate in a state of engaging with each other, and convey two kinds of resin supplied from the supply port 9 toward the kneading portion 12.

The kneading portion 12 comprises disks 15 arranged in the axial direction of the screws 7a and 7b. The disks 15 of the screws 7a and 7b rotate in a state of facing each other, and preliminarily knead resin fed from the feed portion 11. The kneaded resin is fed to the pumping portion 13 by the rotation of the screws 7a and 7b.

The pumping portion 13 comprises a spirally twisted flight 16. The flights 16 of the screws 7a and 7b rotate in a state of engaging each other, and extrude preliminarily kneaded resin from a discharge end of the barrel 6.

According to the above-described twin screw kneader, resin supplied to the feed portion 11 of the screws 7a and 7b is melted by shearing heat produced by the rotation of the screws 7a and 7b and heat of the heater. The resin melted by being preliminarily kneaded by the twin screw kneader constitutes blended raw materials. As indicated by arrow A in FIG. 1, the raw materials are continuously supplied from the discharge end of the barrel 6 to the second extruder 3.

Moreover, since the first extruder 2 is formed as a twin screw kneader, it is possible, not only to melt resin, but also to impart shearing action to the resin. Thus, at a point in time when raw materials are supplied to the second extruder 3, the raw materials are melted by being preliminarily kneaded by the first extruder 2 and held at optimum viscosity. In addition, since the first extruder 2 is formed as a twin screw kneader, a predetermined amount of raw materials can be stably supplied per unit time when raw materials are continuously supplied to the second extruder 3. Accordingly, the workload of the second extruder 3, which kneads raw materials thoroughly, can be reduced.

The second extruder 3 is an element for producing kneaded materials having a microscopic dispersion structure in which macromolecular components of raw materials are dispersed at a nanolevel. In the present embodiment, a single screw extruder is used as the second extruder 3. The single screw extruder comprises a barrel 20 and a screw 21. The screw 21 has the function of repeatedly imparting shearing action and extension action to melted raw materials. The structure of the second extruder 3 including the screw 21 will be described later in detail.

The third extruder 4 is an element for drawing and removing gaseous components included in kneaded materials discharged from the second extruder 3. In the present embodiment, a single screw extruder is used as the third extruder 4. As shown in FIG. 4, the single screw extruder comprises a barrel 22 and a vented screw 23 accommodated in the barrel 22. The barrel 22 includes a cylinder portion 24 having a straight cylindrical shape. Kneaded materials extruded from the second extruder 3 are continuously supplied to the cylinder portion 24 from one end portion in the axial direction of the cylinder portion 24.

The barrel 22 comprises a vent-port 25. The vent-port 25 is opened in a middle portion in the axial direction of the cylinder portion 24, and is connected to a vacuum pump 26. Moreover, the other end portion of the cylinder portion 24 of the barrel 22 is closed by a head portion 27. The head portion 27 comprises a discharge port 28 through which kneaded materials are discharged.

The vented screw 23 is accommodated in the cylinder portion 24. The vented screw 23 is rotated in one direction upon receipt of torque transmitted from a motor not shown in the figures. The vented screw 23 comprises a spirally twisted flight 29. The flight 29 rotates integrally with the vented screw 23, and continuously conveys kneaded materials supplied to the cylinder portion 24 toward the head portion 27. The kneaded materials are subjected to vacuum pressure of the vacuum pump 26 when being conveyed to a position corresponding to the vent-port 25. That is, gaseous materials and other volatile components included in kneaded materials are continuously drawn and removed from the kneaded materials by creating negative pressure in the cylinder portion 24 by the vacuum pump. The kneaded materials, from which gaseous materials and other volatile components are removed, are continuously discharged from the discharge port 28 of the head portion 27 to the outside of the high shearing processing apparatus 1.

Next, the second extruder 3 will be described in detail.

Figure 5:
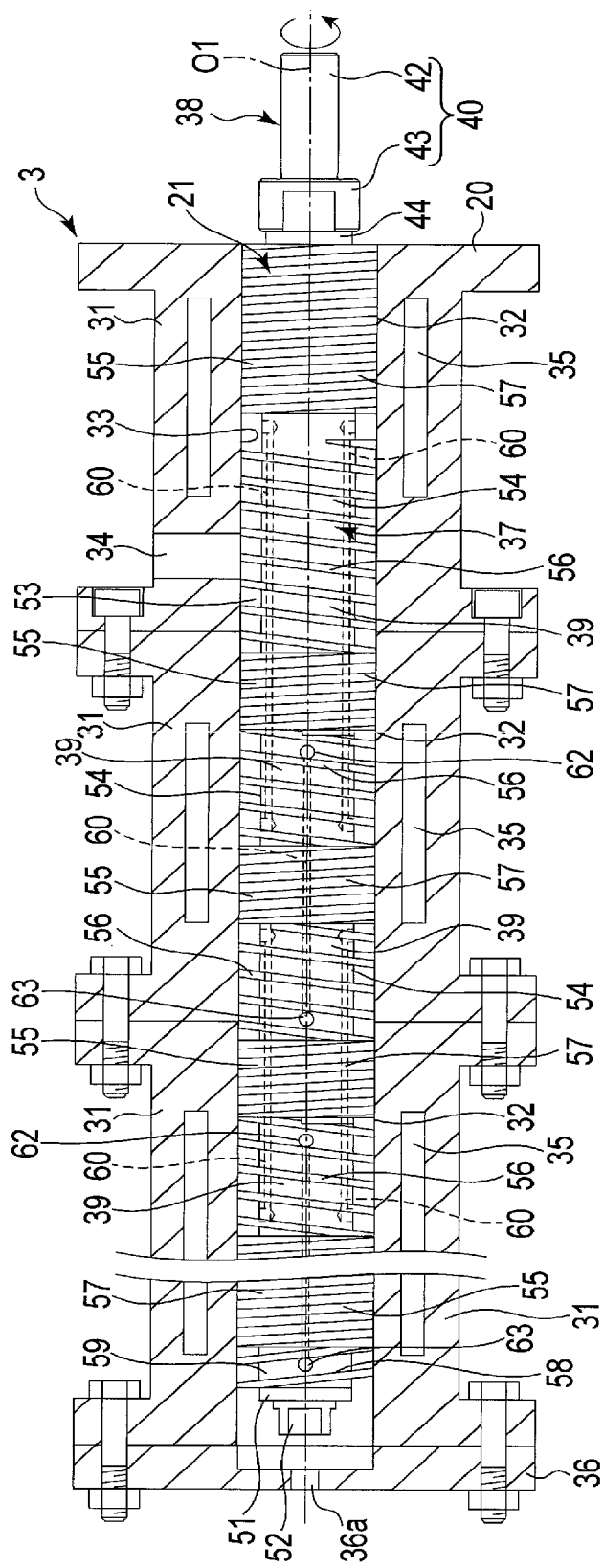
FIG. 5 is a sectional view of a second extruder used in the first embodiment.
Figure 6:
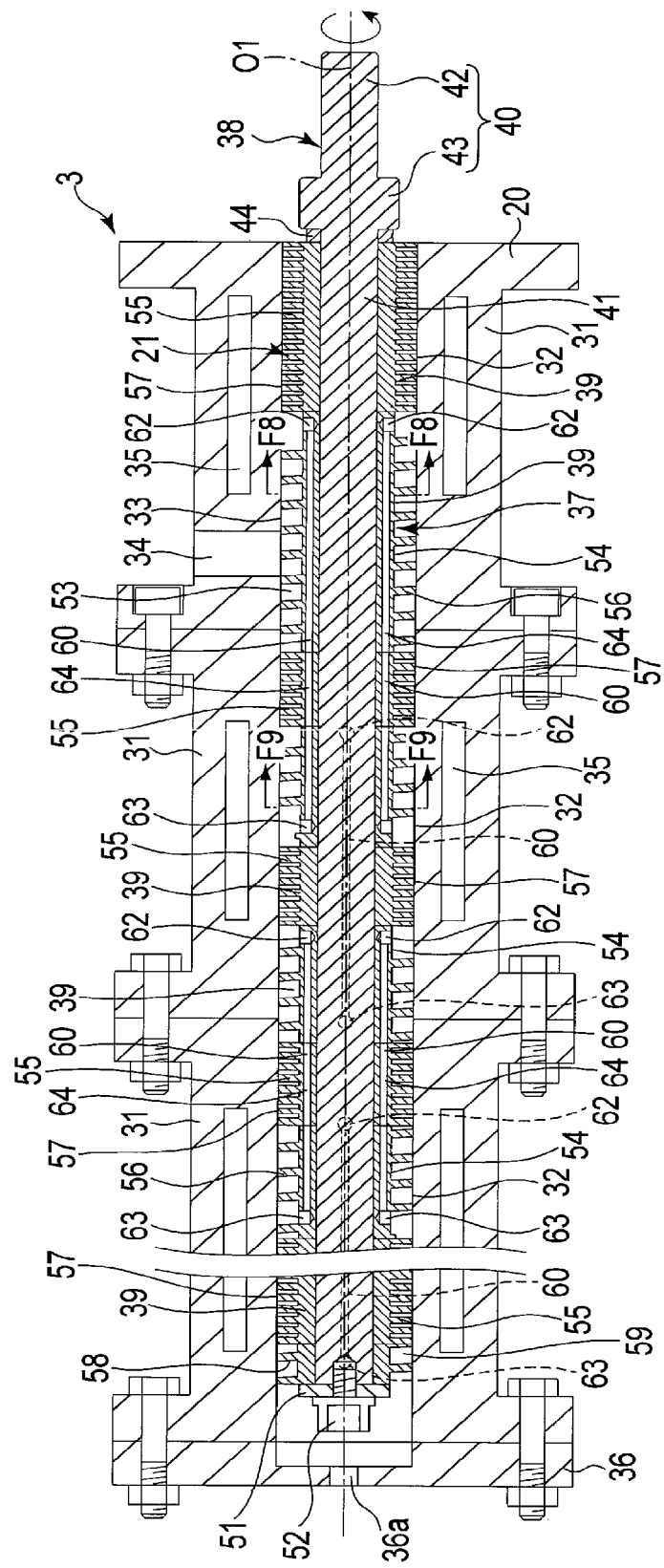
FIG. 6 is a sectional view of the second extruder sectionally showing both a barrel and a screw in the first embodiment.

As shown in FIG. 5 and FIG. 6, the barrel 20 of the second extruder 3 has a straight tubular shape, and is horizontally disposed. The barrel 20 is divided into barrel elements 31.

Each of the barrel elements 31 comprises a cylindrical through-hole 32. The barrel elements 31 are integrally joined, such that the respective through-holes 32 coaxially continue. The through-holes 32 of the barrel elements 31 define a cylinder portion 33 having a cylindrical shape inside the barrel 20 in cooperation with each other. The cylinder portion 33 extends in the axial direction of the barrel 20.

A supply port 34 is formed in one end portion in the axial direction of the barrel 20. The supply port 34 communicates with the cylinder portion 33, and raw materials blended by the first extruder 2 are continuously supplied to the supply port 34.

The barrel 20 comprises a heater not shown in the figures. The heater adjusts the temperature of the barrel 20 to an optimum value for kneading raw materials. Moreover, the barrel 20 comprises refrigerant paths 35 through which a refrigerant, for example, water or oil, flows. The refrigerant paths 35 are disposed to surround the cylinder portion 33. The refrigerant flows along the refrigerant paths 35 and forcibly refrigerates the barrel 20, when the temperature of the barrel 20 exceeds a predetermined upper limit.

The other end portion in the axial direction of the barrel 20 is closed by a head portion 36. The head portion 36 comprises a discharge port 36a. The discharge port 36a is positioned on the opposite side to the supply port 34 in the axial direction of the barrel 20, and is connected to the third extruder 4.

Figure 7:
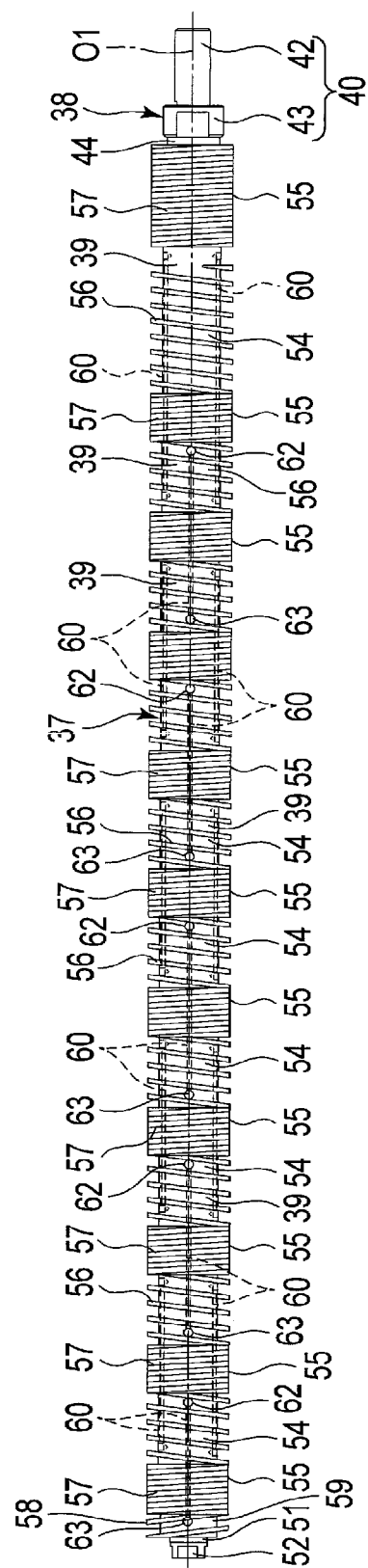
FIG. 7 is a side view of the screw used in the first embodiment.

As shown in FIG. 5 to FIG. 7, the screw 21 comprises a screw main body 37. The screw main body 37 of the present embodiment is composed of an axis of rotation 38 and cylindrical tubes 39.

The axis of rotation 38 comprises a first axial portion 40 and a second axial portion 41. The first axial portion 40 is positioned at the basal end of the axis of rotation 38, which is the one end portion side of the barrel 20. The first axial portion 40 includes a joint portion 42 and a stopper portion 43. The joint portion 42 is coupled to a driving source such as a motor through a coupling not shown in the figures. The stopper portion 43 is coaxially provided on the joint portion 42. The stopper portion 43 is greater in diameter than the joint portion 42.

The second axial portion 41 coaxially extends from an end face of the stopper portion 43 of the first axial portion 40. The second axial portion 41 has a length substantially the same as the total length of the barrel 20, and comprises a tip facing the head portion 36. A straight axial line O1 coaxially penetrating the first axial portion 40 and the second axial portion 41 horizontally extends in the axial direction of the axis of rotation 38.

Figure 8:
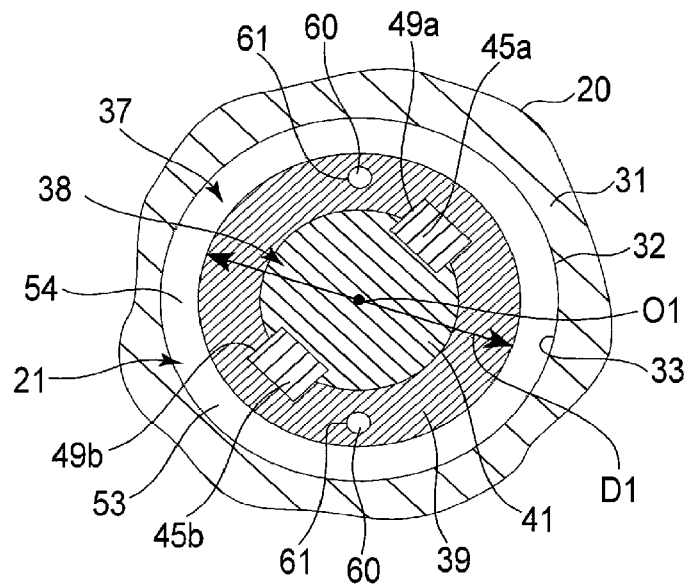
FIG. 8 is a sectional view along line F8-F8 of FIG. 6.
Figure 9:
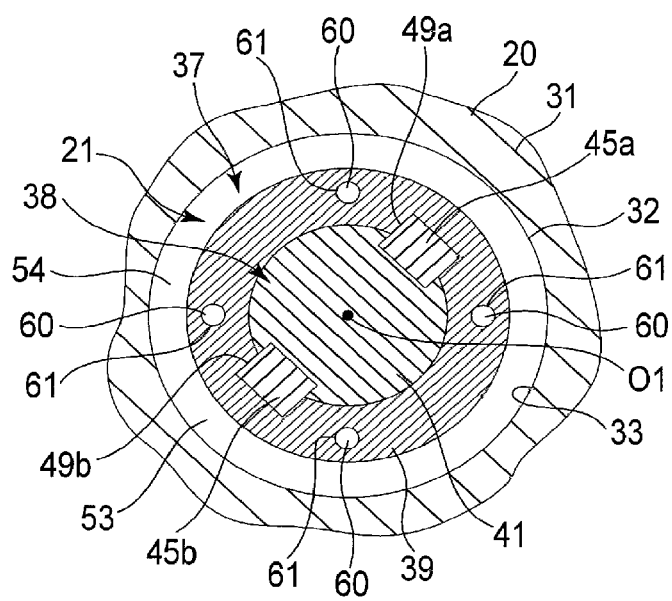
FIG. 9 is a sectional view along line F9-F9 of FIG. 6.

The second axial portion 41 has a solid columnar shape smaller in diameter than the stopper portion 43. As shown in FIG. 8 and FIG. 9, a pair of keys 45a and 45b is attached to the outer circumferential surface of the second axial portion 41. The keys 45a and 45b extend in the axial direction of the second axial portion 41 at positions shifted 180° in the circumferential direction of the second axial portion 41.

As shown in FIG. 6 to FIG. 9, each of the tubes 39 is formed, such that the second axial portion 41 coaxially penetrates therethrough. A pair of keyways 49a and 49b is formed in the inner circumferential surfaces of the tubes 39. The keyways 49a and 49b extend in the axial direction of the tubes 39 at positions shifted 180° in the circumferential direction of the tubes 39.

The tubes 39 are inserted on the second axial portion 41 from the direction of the tip of the second axial portion 41 in a state in which the keyways 49a and 49b are fitted to the keys 45a and 45b of the second axial portion 41. In the present embodiment, a first collar 44 exists between the tube 39 inserted first on the second axial portion 41 and the end face of the stopper portion 43 of the first axial portion 40. Moreover, after all the tubes 39 are inserted on the second axial portion 41, a fixing screw 52 is screwed into a tip surface of the second axial portion 41 through a second collar 51.

All the tubes 39 are thereby constricted in the axial direction of the second axial portion 41 between the first collar 44 and the second collar 51, and the end faces of the adjacent tubes 39 are firmly affixed to each other without any gap.

At this time, all the tubes 39 are coaxially joined on the second axial portion 41, whereby each of the tubes 39 and the axis of rotation 38 are integrally assembled. This makes it possible to rotate each of the tubes 39 on the axial line O1 together with the axis of rotation 38, that is, rotate the screw main body 37 on the axial line O1.

In such a state, each of the tubes 39 serves as a structural element that defines the outside diameter D1 (see FIG. 8) of the screw main body 37. That is, the outside diameters D1 of the tubes 39 coaxially joined along the second axial portion 41 are set to be equal to each other. The outside diameter D1 of the screw main body 37 (each of the tubes 39) is defined as a diameter passing through the axial line O1, which is the center of rotation of the axis of rotation 38.

The segmental screw 21 in which the outside diameter D1 of the screw main body 37 (each of the tubes 39) is a fixed value is thereby formed. In the segmental screw 21, screw elements can be held in free order and combination along the axis of rotation 38 (that is, the second axial portion 41). With respect to the screw elements, for example, each of the tubes 39 on which at least parts of flights 56, 57, and 58, which will be described later, are formed can be defined as one screw element.

In this manner, by segmenting the screw 21, its convenience can be significantly improved with respect to, for example, changes and adjustments to the specifications or the upkeep and maintenance of the screw 21.

In the present embodiment, the cylindrical tubes 39 are not restricted to being fixed to the axis of rotation 38 by the keys 45a and 45b. For example, the tubes 39 may be fixed to the axis of rotation 38 by a spline as shown in FIG. 2 instead of the keys 45a and 45b.

Moreover, the segmental screw 21 is coaxially accommodated in the cylinder portion 33 of the barrel 20. Specifically, the screw main body 37 with the screw elements held along the axis of rotation 38 (the second axial portion 41) is rotatably accommodated in the cylinder portion 33. In this state, the first axial portion 40 (the joint portion 42 and the stopper portion 43) of the axis of rotation 38 projects from the one end portion of the barrel 20 to the outside of the barrel 20.

Moreover, in this state, a conveyance path 53 for conveying raw materials is formed between the outer circumferential surface in the circumferential direction of the screw main body 37 and the inner circumferential surface of the cylinder portion 33. The conveyance path 53 has an annular sectional shape in the radial direction of the cylinder portion 33, and extends in the axial direction along the cylinder portion 33.

In the present embodiment, the screw 21 rotates left-handed in an anticlockwise direction from the perspective of the basal end side of the screw 21 as indicated by an arrow in FIG. 5 upon receipt of torque from a driving source. At this time, it is preferable that the rotational rate of the screw 21 be 600 to 3,000 rpm.

As shown in FIG. 5 to FIG. 7, the screw main body 37 comprises conveyance portions 54 and 59 for conveying raw materials and barrier portions 55 for limiting the flow of raw materials. To be specific, a barrier portion 55 is disposed at the basal end of the screw main body 37, which corresponds to the one end portion of the barrel 20, and the discharge conveyance portion 59 is disposed at the tip of the screw main body 37, which corresponds to the other end portion of the barrel 20. Moreover, between the barrier portion 55 and the conveyance portion 59, the conveyance portions 54 and the barrier portions 55 are alternately disposed in the axial direction from the basal end toward the tip of the screw main body 37.

The supply port 34 of the barrel 20 opens toward the conveyance portion 54 disposed on the basal end side of the screw main body 37.

Each of the conveyance portions 54 comprises the flight 56 spirally twisted. The flight 56 projects from the outer circumferential surface in the circumferential direction of the tubes 39 toward the conveyance path 53. The flight 56 is twisted to convey raw materials from the tip toward the basal end of the screw main body 37 when the screw 21 rotates left-handed. That is, the flight 56 is twisted left-handed as in the case of a left-handed screw.

Moreover, the discharge conveyance portion 59 comprises the flight 58 spirally twisted. The flight 58 projects from the outer circumferential surface in the circumferential direction of the tubes 39 toward the conveyance path 53. The flight 58 is twisted to convey raw materials from the basal end toward the tip of the screw main body 37 when the screw 21 rotates left-handed. That is, the flight 58 is twisted right-handed as in the case of a right-handed screw.

Each of the barrier portions 55 comprises the flight 57 spirally twisted. The flight 57 projects from the outer circumferential surface in the circumferential direction of the tubes 39 toward the conveyance path 53. The flight 57 is twisted to convey raw materials from the basal end toward the tip of the screw main body 37 when the screw 21 rotates left-handed. That is, the flight 57 is twisted right-handed as in the case of a right-handed screw.

The twist pitch of the flight 57 of each of the barrier portions 55 is set to be smaller than or equal to those of the flights 56 and 58 of the conveyance portions 54 and 59. Moreover, a slight clearance is secured between the apexes of the flights 56, 57, and 58 and the inner circumferential surface of the cylinder portion 33 of the barrel 20.

In this case, the clearance between the outside diameter portions of the barrier portions 55 (the apexes of the flights 57) and the inner circumferential surface of the cylinder portion 33 is preferably set to be within a range of 0.1 to 2 mm. More preferably, the clearance is set to be within a range of 0.1 to 0.7 mm. This can surely limit the conveyance of raw materials through the clearance.

The axial direction of the screw main body 37 can also be referred to as the longitudinal direction of the screw main body 37, in other words, the longitudinal direction of the screw 21.

Here, the lengths of the conveyance portions 54 and 59 in the axial direction of the screw main body 37 are set as appropriate in accordance with, for example, the kind of raw materials, the degree of kneading of raw materials, and the production of kneaded materials per unit time. The conveyance portions 54 and 59 are at least areas where the flights 56 and 58 are formed on the outer circumferential surfaces of the tubes 39, but are not limited to areas between the start points and the end points of the flights 56 and 58.

That is, areas outside the flights 56 and 58 of the outer circumferential surfaces of the tubes 39 may be regarded as the conveyance portions 54 and 59. For example, if a cylindrical spacer or a cylindrical collar is disposed at a position adjacent to the tubes 39 comprising the flights 56 and 58, the spacer or the collar also can be included in the conveyance portions 54 and 59.

Moreover, the lengths of the barrier portions 55 in the axial direction of the screw main body 37 are set as appropriate in accordance with, for example, the kind of raw materials, the degree of kneading of raw materials, and the production of kneaded materials per unit time. The barrier portions 55 function to stop the flow of raw materials fed by the conveyance portions 54. That is, the barrier portions 55 are adjacent to the conveyance portions 54 on the downstream side in the conveyance direction of raw materials, and configured to prevent raw materials fed by the conveyance portions 54 from passing through the clearance between the apexes of the flights 57 and the inner circumferential surface of the cylinder portion 33.

Moreover, in the above-described screw 21, each of the flights 56, 57, and 58 projects from the outer circumferential surfaces of the tubes 39 having the outside diameters D1 equal to each other toward the conveyance path 53. Thus, the outer circumferential surface in the circumferential direction of each of the tubes 39 defines the root diameter of the screw 21. The root diameter of the screw 21 is kept at a fixed value over the total length of the screw 21.

As shown in FIG. 5 to FIG. 7 and FIG. 10, the screw main body 37 comprises paths 60 extending in the axial direction inside the screw main body 37. If one barrier portion 55 and two conveyance portions 54, between which the barrier portion 55 is sandwiched, are regarded as one unit, a path 60 is formed over tubes 39 of the pair of conveyance portions 54 and a tube 39 of the barrier portion 55.

In this case, the paths 60 are arranged at predetermined intervals (for example, regular intervals) in the axial direction of the screw main body 37. In addition, in a middle portion in the axial direction of the screw main body 37, four paths 60 extending in the axial direction of the screw main body 37 are arranged at intervals of 90° in the circumferential direction of the screw main body 37.

Moreover, the paths 60 are provided at positions eccentric to the axial line O1 of the axis of rotation 38 inside the tubes 39. In other words, the paths 60 are shifted from the axial line O1, and revolve around the axial line O1 when the screw main body 37 rotates.

As shown in FIG. 8 and FIG. 9, the paths 60 are, for example, holes having a circular sectional shape. The inside diameter of the holes is, for example, set to be greater than or equal to 1 mm but less than 6 mm, and preferably, greater than or equal to 1 mm but less than 5 mm. Moreover, the tubes 39 of the conveyance portions 54 and the barrier portions 55 comprise tubular wall surfaces 61 defining the holes. That is, the paths 60 are holes composed of hollow spaces only, and the wall surfaces 61 continuously surround the hollow paths 60 in the circumferential direction. The paths 60 are thereby formed as hollow spaces which allow only the flow of raw materials. In other words, inside the paths 60, there are no other elements constituting the screw main body 37. Moreover, the wall surfaces 61 revolve around the axial line O1 without rotating on the axial line O1, when the screw main body 37 rotates.

Figure 11:
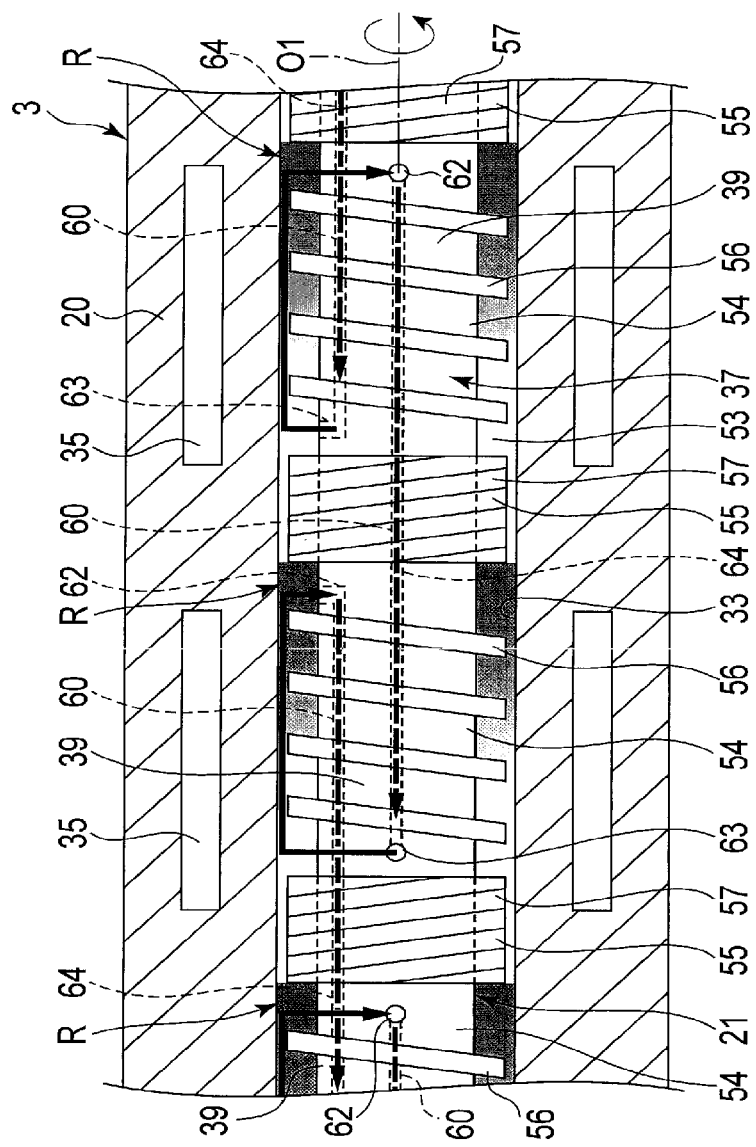
FIG. 11 is a sectional view of the second extruder schematically showing the flow direction of raw materials when the screw rotates in the first embodiment.

As shown in FIG. 5, FIG. 6, and FIG. 11, each of the paths 60 comprises an entrance 62, an exit 63, and a path main body 64 connecting the entrance 62 and the exit 63. The entrance 62 and the exit 63 are provided to be remote from both sides of one barrier portion 55. Specifically, in the conveyance portion 54 adjacent to the barrier portion 55 from the basal end side of the screw main body 37, the entrance 62 is opened in the outer circumferential surface near the downstream end of the conveyance portion 54. In addition, in the conveyance portion 54 adjacent to the barrier portion 55 from the tip side of the screw main body 37, the exit 63 is opened in the outer circumferential surface near the upstream end of the conveyance portion 54.

The path main body 64 extends straight without branching on the way in the axial direction of the screw main body 37. The figures show, as an example, a state in which the path main body 64 extends parallel to the axial line O1. Both sides of the path main body 64 are closed in the axial direction.

The entrance 62 is provided on one side of the path main body 64, that is, a portion closer to the basal end of the screw main body 37. In this case, the entrance 62 may be opened in the outer circumferential surface of the screw main body 37 from an end face on the one side of the path main body 64, or may be opened in the outer circumferential surface of the screw main body 37 from a portion closer to the end face on the one side of the path main body 64, that is, a portion located short of the end face. The opening direction of the entrance 62 is not limited to those orthogonal to the axial line O1, but may be those crossing the axial line O1. In this case, entrances 62 may be provided by opening one side of the path main body 64 in directions.

From another point of view, the entrance 62 is opened in the outer circumferential surface of the conveyance portion 54 more remote in the direction of the basal end of the screw main body 37 than the barrier portion 55 in the above-described one unit. It is preferable that the entrance 62 be provided at a position most remote in the direction of the basal end of the screw main body 37 on the outer circumferential surface of the tube 39 constituting the conveyance portion 54. The entrance 62 is thereby positioned just before the barrier portion 55 adjacent to the conveyance portion 54 in which the entrance 62 is opened in the direction of the basal end of the screw main body 37.

The exit 63 is provided on the other side (the opposite side to the one side) of the path main body 64, that is, a portion closer to the tip of the screw main body 37. In this case, the exit 63 may be opened in the outer circumferential surface of the screw main body 37 from an end face on the other side of the path main body 64, or may be opened in the outer circumferential surface of the screw main body 37 from a portion closer to the end face on the other side of the path main body 64, that is, a portion located short of the end face. The opening direction of the exit 63 is not limited to those orthogonal to the axial line O1, but may be those crossing the axial line O1. In this case, exits 63 may be provided by opening one side of the path main body 64 in directions.

From another point of view, the exit 63 is opened in the outer circumferential surface of the conveyance portion 54 more remote in the direction of the tip of the screw main body 37 than the barrier portion 55 in the above-described one unit. It is preferable that the exit 63 be provided at a position most remote in the direction of the tip of the screw main body 37 on the outer circumferential surface of the tube 39 constituting the conveyance portion 54. The exit 63 is thereby positioned just before the barrier portion 55 adjacent to the conveyance portion 54 in which the exit 63 is opened in the direction of the tip of the screw main body 37.

The path main body 64 connecting the entrance 62 and the exit 63 traverses the barrier portion 55 of the above-described one unit, and has a length stretching between the two conveyance portions 54, between which the barrier portion 55 is sandwiched. In this case, the bore of the path main body 64 may be set to be smaller than those of the entrance 62 and the exit 63, or may be set to be equal to them. In either case, the path sectional area defined by the bore of the path main body 64 is set to be much smaller than the annular sectional area in the radial direction of the above-described annular conveyance path 53.

In the present embodiment, if the screw 21 is disassembled by detaching the tubes 39 on which the flights 56, 57, and 58 are formed from the axis of rotation 38, the tubes 39 on which at least parts of the flights 56, 57, and 58 are formed can also be referred to as the above-described screw elements.

Thus, the screw main body 37 of the screw 21 can be formed by sequentially inserting the tubes 39 as the screw elements on the outer circumference of the axis of rotation 38. Therefore, the conveyance portions 54 and the barrier portions 55 can be exchanged and rearranged in accordance with, for example, the degree of kneading of raw materials, and the exchange and the rearrangement can be easily performed.

Moreover, by constricting the tubes 39 in the axial direction of the second axial portion 41 and firmly affixing the end faces of the adjacent tubes 39 to each other, the path main body 64 of each of the paths 60 is formed, and the entrance 62 and the exit 63 of each of the paths 60 are integrally connected through the path main body 64. Thus, in order to form the paths 60 in the screw main body 37, it suffices that each of the tubes 39 having a length much shorter than the total length of the screw main body 37 is processed. Thus, the paths 60 are easily processed and handled when being formed.

According to the continuous high shearing processing apparatus 1 having the above-described structure, the first extruder 2 preliminarily kneads resins. The resins melted by the kneading become raw materials having flowability, and are continuously supplied from the first extruder 2 to the conveyance path 53 through the supply port 34 of the second extruder 3.

Figure 10:
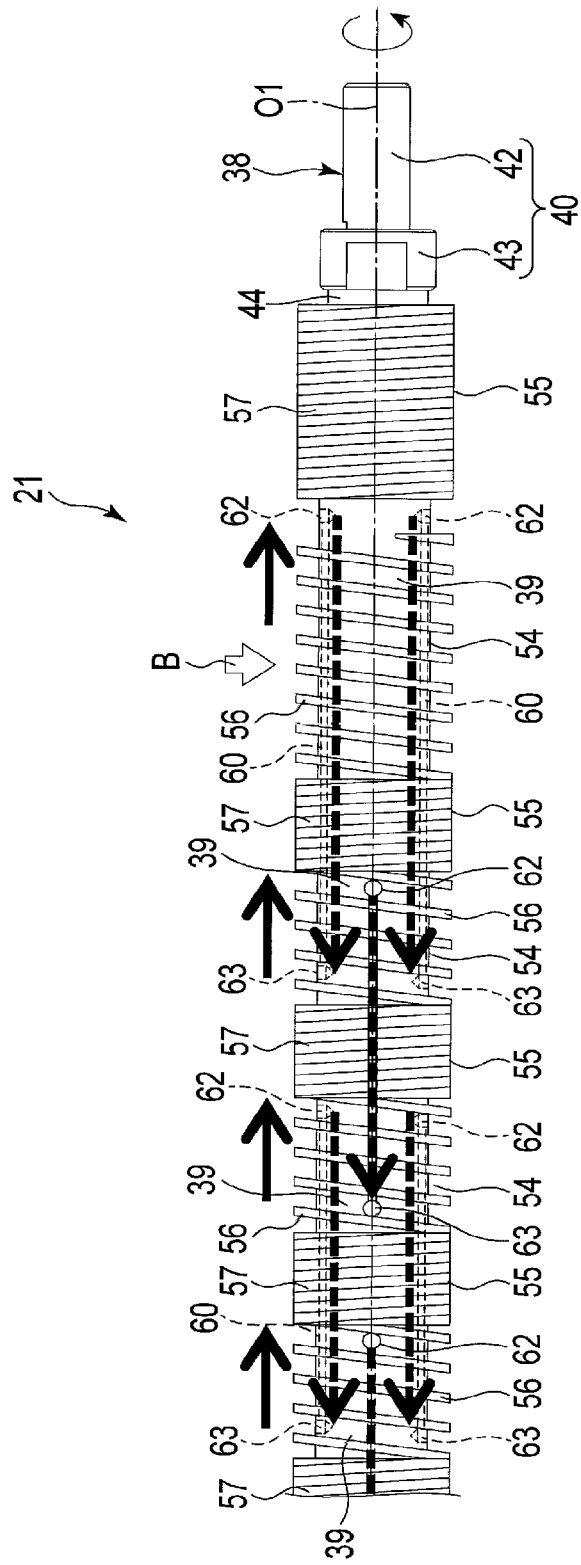
FIG. 10 is a side view showing a flow direction of raw materials with respect to the screw in the first embodiment.

As indicated by arrow B in FIG. 10, the raw materials supplied to the second extruder 3 are introduced to the outer circumferential surface of the conveyance portion 54 positioned on the basal end side of the screw main body 37. At this time, if the screw 21 rotates left-handed in an anticlockwise direction from the perspective of the basal end of the screw main body 37, the flights 56 of the conveyance portions 54 continuously convey the raw materials toward the barrier portion 55 adjacent to the basal end of the screw main body 37 as indicated by solid-line arrows in FIG. 10.

At this time, shearing action, caused by a difference in speed between the flights 56 rotating along the conveyance path 53 and the inner circumferential surface of the cylinder portion 33, is imparted to the raw materials, and the raw materials are stirred by a subtle twist of the flights 56. As a result, the raw materials are kneaded thoroughly, and the dispersion of macromolecular components of the raw materials progresses.

The raw materials, which have been subjected to shearing action, reach boundaries between the conveyance portions 54 and the barrier portions 55 along the conveyance path 53. The flights 57 of the barrier portions 55 are twisted right-handed to convey raw materials from the basal end toward the tip of the screw main body 37 when the screw 21 rotates left-handed. As a result, the conveyance of raw materials is stopped by the flights 57. In other words, when the screw 21 rotates left-handed, the flights 57 of the barrier portions 55 prevent raw materials from passing through the clearance between the barrier portions 55 and the inner circumferential surface of the cylinder portion 33 by limiting the flow of raw materials conveyed by the flights 56.

At this time, the pressure on the raw materials is increased at the boundaries between the conveyance portions 54 and the barrier portions 55. Specifically, FIG. 11 shows the filling rate of raw materials at the places in the conveyance path 53, which correspond to the conveyance portions 54 of the screw main body 37, with gradations. That is, in the conveyance path 53, the filling rate of raw materials becomes greater as the tone becomes darker. As is clear from FIG. 11, the filling rate of raw materials becomes greater as they approach the barrier portions 55 in the conveyance path 53 corresponding to the conveyance portions 54, and just before the barrier portions 55, the filling rate of raw materials is 100%.

Thus, just before the barrier portions 55, a "raw-material receiver R" in which the filling rate of raw materials is 100% is formed. In the raw-material receiver R, the flow of raw materials is stopped, and thus, the pressure on the raw materials is increased. As indicated by broken-line arrows in FIG. 10 and FIG. 11, the raw materials, the pressure on which has been increased, continuously flow into the path main body 64 from the entrance 62 opening in the outer circumferential surfaces of the conveyance portions 54, and continuously flow through the path main body 64 from the basal end toward the tip of the screw main body 37.

As described above, the path sectional area defined by the bore of the path main body 64 is much smaller than the annular sectional area of the conveyance path 53 in the radial direction of the cylinder portion 33. From another point of view, a widening area based on the bore of the path main body 64 is much smaller than that of the annular conveyance path 53. Therefore, raw materials are rapidly squeezed when flowing from the entrance 62 into the path main body 64, and thus, extension action is imparted to the raw materials.

Moreover, since the path sectional area is sufficiently smaller than the annular sectional area, raw materials collecting in the raw-material receiver R do not disappear. That is, some of the raw materials collecting in the raw-material receiver R continuously flow into the entrance 62. In the meantime, new raw materials are fed toward the barrier portions 55 by the flights 56. As a result, the filling rate just before the barrier portions 55 in the raw-material receiver R is thereby kept at 100% all the time. At this time, even if the amount of raw materials conveyed by the flights 56 somewhat changes, the change is absorbed by raw materials remaining in the raw-material receiver R. Raw materials can be thereby continuously and stably supplied to the paths 60. Thus, in the paths 60, extension action can be uninterruptedly and continuously imparted to the raw materials.

The raw materials which have passed through the path main body 64 flow out of the exit 63 as indicated by solid-line arrows in FIG. 11. The raw materials are thereby continuously returned to the other conveyance portions 54 adjacent to the barrier portions 55 in the direction of the tip of the screw main body 37. The returned raw materials are continuously conveyed in the direction of the basal end of the screw main body 37 by the flights 56 of the conveyance portions 54, and are subjected to shearing action again in the process of being conveyed. The raw materials, which have been subjected to shearing action, continuously flow into the path main body 64 from the entrance 62, and are subjected to extension action again in the process of flowing through the path main body 64.

In the present embodiment, the conveyance portions 54 and the barrier portions 55 are alternately arranged in the axial direction of the screw main body 37, and the paths 60 are arranged with a space therebetween in the axial direction of the screw main body 37. Thus, the raw materials introduced to the screw main body 37 from the supply port 34 are continuously conveyed from the basal end toward the tip of the screw main body 37 while being alternately and repeatedly subjected to shearing action and extension action as indicated by arrows in FIG. 10 and FIG. 11. Thus, the degree of kneading of raw materials is increased, and the dispersion of macromolecular components of the raw materials is promoted.

The raw materials which have reached the tip of the screw main body 37 become sufficiently kneaded materials, and flow out of the exit 63 of each of the paths 60. The kneaded materials which have flowed out are continuously conveyed to a gap between the cylinder portion 33 and the head portion 36 by the flight 58 of the discharge conveyance portion 59, and then continuously supplied to the third extruder 4 from the discharge port 36a.

As already described, in the third extruder 4, gaseous materials and other volatile components included in kneaded materials are continuously removed from the kneaded materials. The kneaded materials, from which gaseous materials and other volatile components are removed, are continuously discharged from the discharge port 28 of the head portion 27 to the outside of the high shearing processing apparatus 1. The discharged kneaded materials are soaked in cooling water stored in a water tank. The kneaded materials are thereby forcibly cooled, and a desired resin molding is obtained.

As described above, according to the first embodiment, in the second extruder 3, raw materials supplied from the first extruder 2 are conveyed while being reversed more than once in the axial direction of the screw main body 37, and in the process of conveyance, shearing action and extension action are repeatedly imparted to the raw materials. In other words, raw materials do not circulate through the same places on the outer circumferential surface of the screw main body 37 many times, and thus can be uninterruptedly supplied to the third extruder 4 from the second extruder 3.

Accordingly, kneaded materials that are sufficiently kneaded can be continuously molded, and the production efficiency of kneaded materials can be dramatically increased as compared to that of a batch extruder.

Along with this, in the present embodiment, resin preliminarily kneaded by the first extruder 2 continues being uninterruptedly supplied to the second extruder 3. Thus, the flow of resin does not temporarily stagnate inside the first extruder 2. Temperature change, viscosity change, or phase change of the resin, caused when the kneaded resin stagnates inside the first extruder 2, can be thereby prevented. As a result, raw materials having uniform quality all the time can be supplied to the second extruder 3 from the first extruder 2.

Moreover, according to the first embodiment, the completely continuous production, not apparently continuous production, of kneaded materials is enabled. That is, shearing action and extension action can be alternately imparted to raw materials in the second extruder 3 while raw materials are uninterruptedly and continuously conveyed from the first extruder 2 to the second extruder 3 and the third extruder 4. According to the above-described structure, raw materials in a melted state can be stably supplied from the first extruder 2 to the second extruder 3.

Moreover, according to the first embodiment, in the completely continuous production, the optimum operating conditions can be set for the first extruder 2 and the second extruder 3, while their operating conditions are associated with each other. For example, if resin is preliminarily kneaded with the first extruder 2, the screw rotational rate can be set at 100 to 300 rpm as it has been conventionally set. Thus, the resin can be sufficiently heated and melted, and preliminarily kneaded. On the other hand, in the second extruder 3, the screw 21 can be rotated at a high rate of 600 to 3,000 rpm. Thus, shearing action and extension action can be alternately and effectively imparted to the resin.

Accordingly, it suffices that the first extruder 2 and the second extruder 3 comprise screws according to the respective roles or functions. That is, it suffices that the first extruder 2 comprises the screws 7a and 7b according to the role or function of preliminarily kneading supplied materials. On the other hand, it suffices that the second extruder 3 comprises the screw 21 according to the role or function of imparting shearing action and extension action to raw materials in a melted state supplied from the first extruder 2. The first extruder 2 and the second extruder 3 can be thereby prevented from being elongated.

Furthermore, in the screw 21, the conveyance portions 54, the barrier portions 55, and the paths 60 are disposed in combination without a plasticization zone provided in a screw of a conventional single screw extruder. Thus, the second extruder 3 can be easily operated.

In addition, the root diameter of the screw 21 is set at a fixed value over the total length of the screw 21. Thus, the conveyance path 53 for conveying raw materials has uniform annular sectional shapes over the total length of the screw 21. When shearing action and extension action are alternately imparted to raw materials, they can be sequentially and smoothly imparted, and uniform kneading can be performed.

Here, results of a high dispersion verification test performed on kneaded materials in the case where raw materials are kneaded while shearing action and extension action are alternately imparted to them by the above-described completely continuous production will be described.

In the test, two kinds of materials, a polycarbonate (PC) resin and a polymethyl methacrylate (PMMA) resin, are supplied to the first extruder 2, in which the effective length (L/D) of the kneading portion 12 with respect to the screw effective length (L/D) 50 is set at 7.9, and materials in a melted state are produced by preliminarily kneading them. In addition, the materials in a melted state are continuously supplied from the first extruder 2 to the second extruder 3 as raw materials of the second extruder 3.

In the test, the screw 21 is configured to repeat the above-described shearing and extension operation ten times. Further, the specifications of the screw 21 are set as follows: the screw diameter is set at 36 mm, the screw effective length (L/D) is set at 25, the screw rotational rate is set at 1,400 rpm, the supply of raw materials is set at 1.4 kg/h, and the barrel set temperature is set at 260° C.

Through the above-described test, intended transparent kneaded materials were continuously obtained.

According to the first embodiment, the paths 60 imparting extension action to raw materials extend in the axial direction of the screw main body 37 at positions eccentric to the axial line O1, which is the center of rotation of the screw main body 37. Thus, the paths 60 revolve around the axial line O1. In other words, the tubular wall surfaces 61 defining the paths 60 revolve around the axial line O1 without rotating on the axial line O1.

Accordingly, when raw materials pass through the paths 60, the raw materials are not actively stirred inside the paths 60 although they are subjected to centrifugal force. Therefore, the raw materials passing through the paths 60 are hardly subjected to shearing action, and the raw materials passing through the paths 60 and returning to the outer circumferential surfaces of the conveyance portions 54 are mainly subjected to extension action.

Therefore, according to the screw 21 of the first embodiment, places where shearing action is imparted to raw materials and places where extension action is imparted to raw materials can be clearly determined. For this reason, a structure advantageous in ascertaining the degree of kneading of raw materials is achieved, and the degree of kneading can be accurately controlled. As a result, kneaded materials having a microscopic dispersion structure in which macromolecular components of raw materials are dispersed at a nanolevel can be produced.

In addition, since all the paths 60 are eccentric to the axial line O1, extension action can be equally imparted to raw materials passing through the paths 60. That is, the discrepancy in kneading conditions between the paths 60 can be resolved, and uniform kneading can be performed.

Second Embodiment

Figure 12:
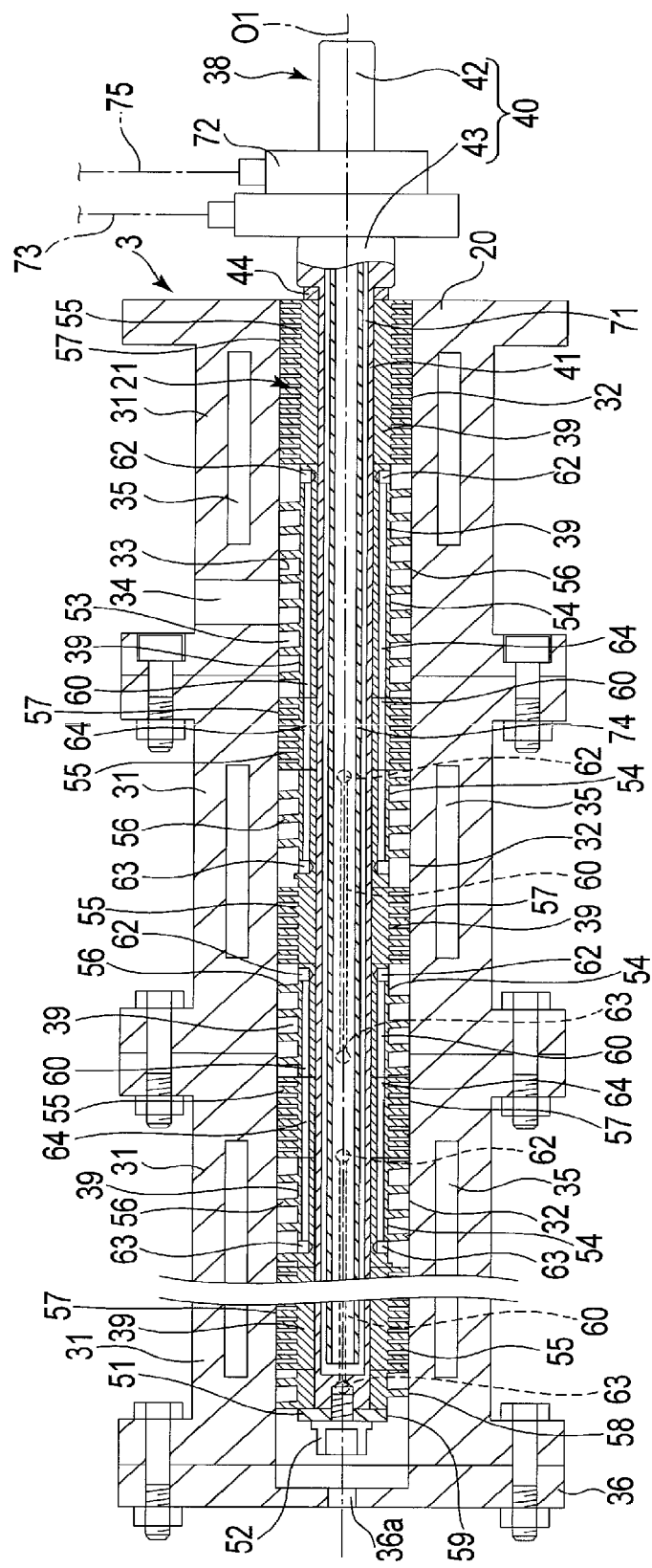
FIG. 12 is a sectional view of a second extruder used in a second embodiment.

FIG. 12 shows a second embodiment. The second embodiment differs from the first embodiment in the matters related to an axis of rotation 38. The other structures of a screw 21 are basically the same as those of the first embodiment. Therefore, in the second embodiment, the same structural portions as those of the first embodiment will be given the same reference numbers, and description thereof will be omitted.

As shown in FIG. 12, a refrigerant path 71 is formed inside the axis of rotation 38. The refrigerant path 71 coaxially extends along an axial line O1 of the axis of rotation 38. One end of the refrigerant path 71 is connected to an exit pipe 73 through a rotary joint 72 at a joint portion 42. The other end of the refrigerant path 71 is liquid-tightly closed by the tip of the axis of rotation 38.

A refrigerant introduction pipe 74 is coaxially inserted in the refrigerant path 71. One end of the refrigerant introduction pipe 74 is connected to an entrance pipe 75 through the rotary joint 72. The other end of the refrigerant introduction pipe 74 is opened in the refrigerant path 71 near the other end of the refrigerant path 71.

In the second embodiment, a refrigerant such as water or oil is fed from the entrance pipe 75 to the refrigerant path 71 through the rotary joint 72 and the refrigerant introduction pipe 74. The refrigerant fed into the refrigerant path 71 returns to the joint portion 42 of the axis of rotation 38 through a gap between the inner circumferential surface of the refrigerant path 71 and the outer circumferential surface of the refrigerant introduction pipe 74, and is returned to the exit pipe 73 through the rotary joint 72.

According to the second embodiment, the refrigerant circulates in the axial direction of the axis of rotation 38, and thus, a screw main body 37 can be refrigerated by the refrigerant. Therefore, the temperature of the screw main body 37 in contact with raw materials can be properly adjusted, and deterioration, change in viscosity, etc., of resin due to a rise in the temperature of the raw materials can be prevented.

Third Embodiment

FIG. 13 to FIG. 18 show a third embodiment. The third embodiment differs from the first embodiment in the matters related to a screw main body 37. The other structures of a screw 21 are basically the same as those of the first embodiment. Therefore, in the third embodiment, the same structural portions as those of the first embodiment will be given the same reference numbers, and description thereof will be omitted.

As shown in FIG. 13 and FIG. 14, cylindrical tubes 39 constituting the screw main body 37 are constricted in the axial direction of a second axial portion 41 between a first collar 44 and a second collar 51, and the end faces of the adjacent tubes 39 are firmly affixed to each other without any gap as in the first embodiment.

At this time, all the tubes 39 are coaxially joined on the second axial portion 41, and each of the tubes 39 and an axis of rotation 38 are integrally assembled. This makes it possible to rotate each of the tubes 39 on an axial line O1 together with the axis of rotation 38, that is, rotate the screw main body 37 on the axial line O1.

In such a state, each of the tubes 39 serves as a structural element that defines the outside diameter D1 (see FIG. 15) of the screw main body 37. That is, the outside diameters D1 of the tubes 39 coaxially joined along the second axial portion 41 are set to be equal to each other. The outside diameter D1 of the screw main body 37 (each of the tubes 39) is defined as a diameter passing through the axial line O1, which is the center of rotation of the axis of rotation 38.

The segmental screw 21 in which the outside diameter D1 of the screw main body 37 (each of the tubes 39) is a fixed value is thereby formed. In the segmental screw 21, screw elements can be held in free order and combination along the axis of rotation 38 (that is, the second axial portion 41). With respect to the screw elements, for example, each of the tubes 39 on which at least parts of flights 84 and 86, which will be described later, are formed can be defined as one screw element.

In this manner, by segmenting the screw 21, its convenience can be significantly improved with respect to, for example, changes and adjustments to the specifications or the upkeep and maintenance of the screw 21.

Moreover, the segmental screw 21 is coaxially accommodated in a cylinder portion 33 of a barrel 20. Specifically, the screw main body 37 with the screw elements held along the axis of rotation 38 (the second axial portion 41) is rotatably accommodated in the cylinder portion 33. In this state, a first axial portion 40 (a joint portion 42 and a stopper portion 43) of the axis of rotation 38 projects from one end portion of the barrel 20 to the outside of the barrel 20.

Moreover, in this state, a conveyance path 53 for conveying raw materials is formed between the outer circumferential surface in the circumferential direction of the screw main body 37 and the inner circumferential surface of the cylinder portion 33. The conveyance path 53 has an annular sectional shape in the radial direction of the cylinder portion 33, and extends in the axial direction of the cylinder portion 33.

As shown in FIG. 13 to FIG. 16, the screw main body 37 comprises conveyance portions 81 for conveying raw materials and barrier portions 82 for limiting the flow of raw materials. To be specific, conveyance portions 81 are disposed at the basal end of the screw main body 37, which corresponds to the one end portion of the barrel 20, and conveyance portions 81 are disposed at the tip of the screw main body 37, which corresponds to the other end portion of the barrel 20. Moreover, between the conveyance portions 81, conveyance portions 81 and the barrier portions 82 are alternately disposed in the axial direction from the basal end toward the tip of the screw main body 37.

A supply port 34 of the barrel 20 opens toward the conveyance portion 81 disposed on the basal end side of the screw main body 37.

Each of the conveyance portions 81 comprises the flight 84 spirally twisted. The flight 84 projects from the outer circumferential surface in the circumferential direction of the tubes 39 toward the conveyance path 53. The flight 84 is twisted to convey raw materials from the basal end toward the tip of the screw main body 37 when the screw 21 rotates left-handed in an anticlockwise direction from the perspective of the basal end of the screw main body 37. That is, the flight 84 is twisted right-handed as in the case of a right-handed screw.

Each of the barrier portions 82 comprises the flight 86 spirally twisted. The flight 86 projects from the outer circumferential surface in the circumferential direction of the tubes 39 toward the conveyance path 53. The flight 86 is twisted to convey raw materials from the tip toward the basal end of the screw main body 37 when the screw 21 rotates left-handed in an anticlockwise direction from the perspective of the basal end of the screw main body 37. That is, the flight 86 is twisted left-handed as in the case of a left-handed screw.

The twist pitch of the flight 86 of each of the barrier portions 82 is set to be smaller than or equal to that of the flight 84 of each of the conveyance portions 81. Moreover, a slight clearance is secured between the apexes of the flights 84 and 86 and the inner circumferential surface of the cylinder portion 33 of the barrel 20. In this case, the clearance between the outside diameter portions of the barrier portions 82 (the apexes of the flights 86) and the inner circumferential surface of the cylinder portion 33 is preferably set to be within a range of 0.1 to 2 mm. More preferably, the clearance is set to be within a range of 0.1 to 0.7 mm. This can surely limit the conveyance of raw materials through the clearance.

Here, the lengths of the conveyance portions 81 in the axial direction of the screw main body 37 are set as appropriate in accordance with, for example, the kind of raw materials, the degree of kneading of raw materials, and the production of kneaded materials per unit time. The conveyance portions 81 are at least areas where the flights 84 are formed on the outer circumferential surfaces of the tubes 39, but are not limited to areas between the start points and the end points of the flights 84.

That is, areas outside the flights 84 of the outer circumferential surfaces of the tubes 39 may be regarded as the conveyance portions 81. For example, if a cylindrical spacer or a cylindrical collar is disposed at a position adjacent to the tubes 39 comprising the flights 84, the spacer or the collar also can be included in the conveyance portions 81.

Moreover, the lengths of the barrier portions 82 in the axial direction of the screw main body 37 are set as appropriate in accordance with, for example, the kind of raw materials, the degree of kneading of raw materials, and the production of kneaded materials per unit time. The barrier portions 82 function to stop the flow of raw materials fed by the conveyance portions 81. That is, the barrier portions 82 are adjacent to the conveyance portions 81 on the downstream side in the conveyance direction of raw materials, and configured to prevent raw materials fed by the conveyance portions 81 from passing through the clearance between the apexes of the flights 86 and the inner circumferential surface of the cylinder portion 33.

Moreover, in the above-described screw 21, each of the flights 84 and 86 projects from the outer circumferential surfaces of the tubes 39 having the outside diameters D1 equal to each other toward the conveyance path 53. Thus, the outer circumferential surface in the circumferential direction of each of the tubes 39 defines the root diameter of the screw 21. The root diameter of the screw 21 is kept at a fixed value over the total length of the screw 21.

Figure 17:
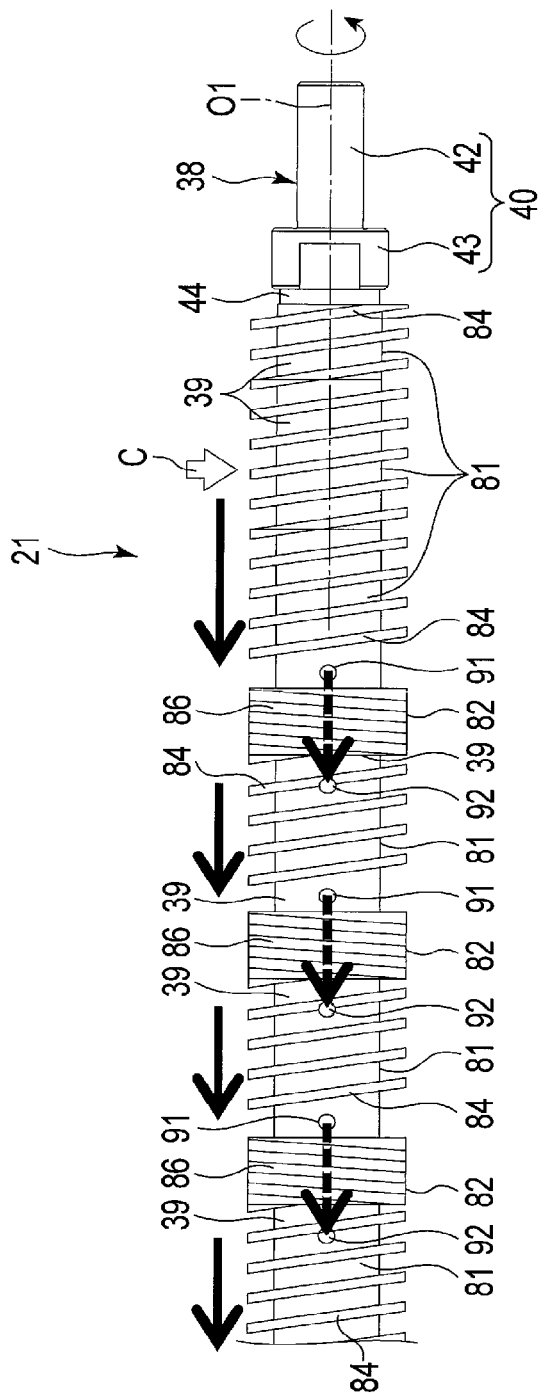
FIG. 17 is a side view showing a flow direction of raw materials with respect to the screw in the third embodiment.

As shown in FIG. 13, FIG. 14, and FIG. 17, the screw main body 37 comprises paths 88 extending in the axial direction of the screw main body 37. If one barrier portion 82 and two conveyance portions 81, between which the barrier portion 82 is sandwiched, are regarded as one unit, a path 88 is formed over tubes 39 of both of the conveyance portions 81 and a tube 39 of the barrier portion 82. In this case, the paths 88 are arranged at predetermined intervals (for example, regular intervals) in the same straight line in the axial direction of the screw main body 37.

Moreover, the paths 88 are provided at positions eccentric to the axial line O1 of the axis of rotation 38 inside the tubes 39. In other words, the paths 88 are shifted from the axial line O1, and revolve around the axial line O1 when the screw main body 37 rotates.

Figure 15:
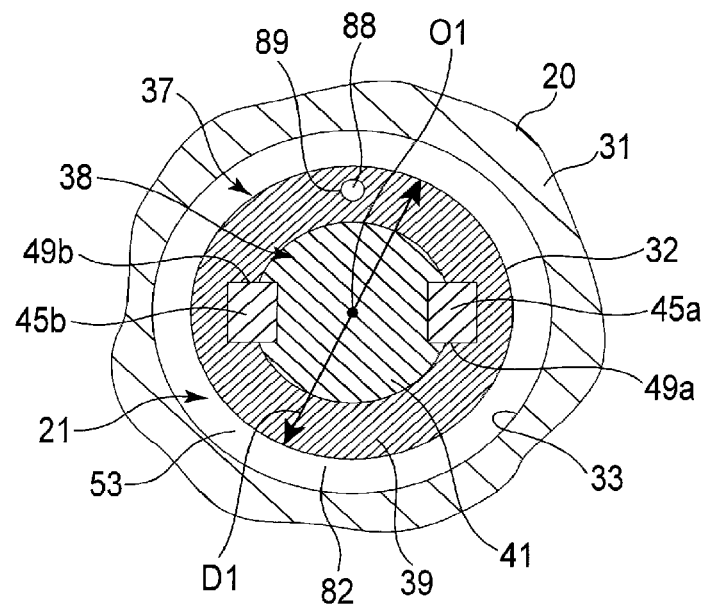
FIG. 15 is a sectional view along line F15-F15 of FIG. 14.
Figure 16:
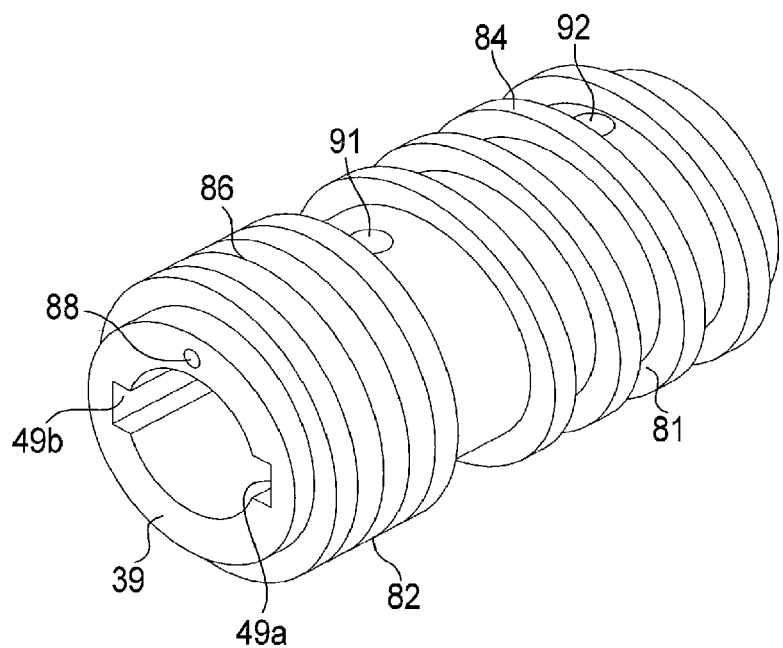
FIG. 16 is a perspective view of a tube used in the third embodiment.

As shown in FIG. 15, the paths 88 are, for example, holes having a circular sectional shape. The inside diameter of the holes is, for example, set to be greater than or equal to 1 mm but less than 6 mm, and preferably, greater than or equal to 1 mm but less than 5 mm. Moreover, the tubes 39 of the conveyance portions 81 and the barrier portions 82 comprise tubular wall surfaces 89 defining the holes. That is, the paths 88 are holes composed of hollow spaces only, and the wall surfaces 89 continuously surround the hollow paths 88 in the circumferential direction. The paths 88 are thereby formed as hollow spaces which allow only the flow of raw materials. In other words, inside the paths 88, there are no other elements constituting the screw main body 37. Moreover, the wall surfaces 89 revolve around the axial line O1 without rotating on the axial line O1, when the screw main body 37 rotates.

Figure 18:
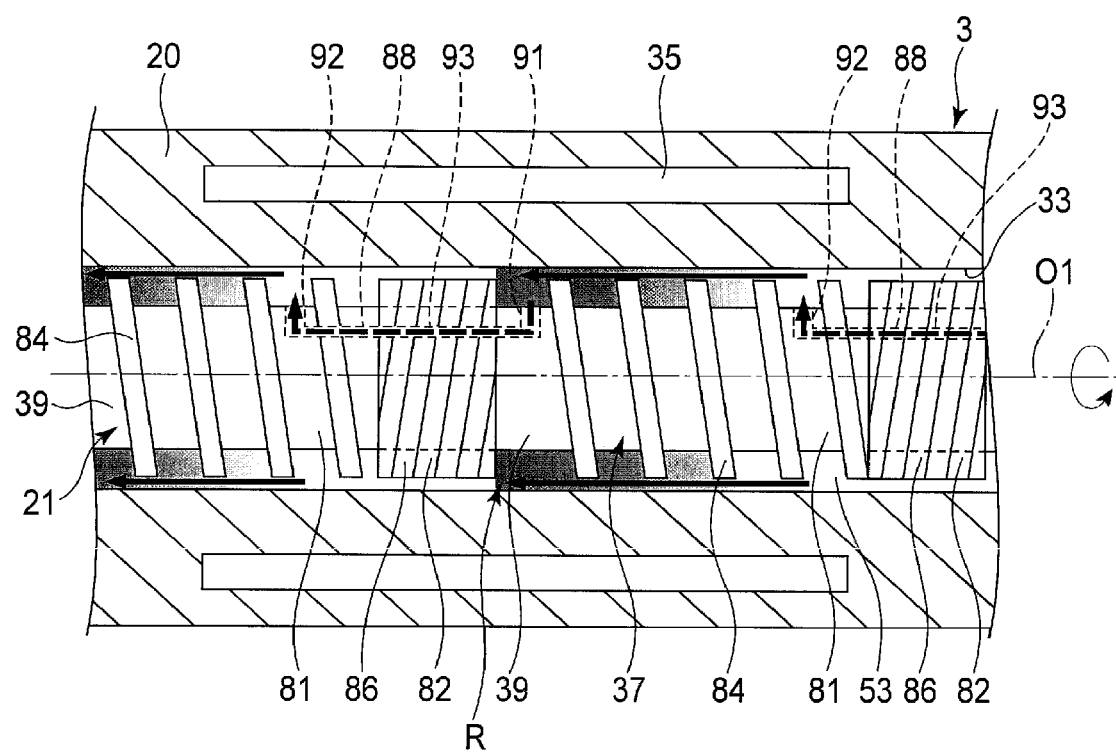
FIG. 18 is a sectional view of the second extruder schematically showing the flow direction of raw materials when the screw rotates in the third embodiment.

As shown in FIG. 13, FIG. 14, and FIG. 18, each of the paths 88 comprises an entrance 91, an exit 92, and a path main body 93 connecting the entrance 91 and the exit 92. The entrance 91 and the exit 92 are provided close to both sides of one barrier portion 82. From another point of view, in one conveyance portion 81 adjacent to two barrier portions 82 adjacent to each other, the entrance 91 is opened in the outer circumferential surface near the downstream end of the conveyance portion 81, and the exit 92 is opened in the outer circumferential surface near the upstream end of the conveyance portion 81.

The path main body 93 extends straight without branching on the way in the axial direction of the screw main body 37. The figures show, as an example, a state in which the path main body 93 extends parallel to the axial line O1. Both sides of the path main body 93 are closed in the axial direction.

The entrance 91 is provided on one side of the path main body 93, that is, a portion closer to the basal end of the screw main body 37. In this case, the entrance 91 may be opened in the outer circumferential surface of the screw main body 37 from an end face on the one side of the path main body 93, or may be opened in the outer circumferential surface of the screw main body 37 from a portion closer to the end face on the one side of the path main body 93, that is, a portion located short of the end face. The opening direction of the entrance 91 is not limited to those orthogonal to the axial line O1, but may be those crossing the axial line O1. In this case, entrances 91 may be provided by opening one side of the path main body 93 in directions.

The exit 92 is provided on the other side (the opposite side to the one side) of the path main body 93, that is, a portion closer to the tip of the screw main body 37. In this case, the exit 92 may be opened in the outer circumferential surface of the screw main body 37 from an end face on the other side of the path main body 93, or may be opened in the outer circumferential surface of the screw main body 37 from a portion closer to the end face on the other side of the path main body 93, that is, a portion located short of the end face.

The opening direction of the exit 92 is not limited to those orthogonal to the axial line O1, but may be those crossing the axial line O1. In this case, exits 92 may be provided by opening one side of the path main body 93 in directions.

The path main body 93 connecting the entrance 91 and the exit 92 traverses the barrier portion 82 of the above-described one unit, and has a length stretching between the two conveyance portions 81, between which the barrier portion 82 is sandwiched. In this case, the bore of the path main body 93 may be set to be smaller than those of the entrance 91 and the exit 92, or may be set to be equal to them. In either case, the path sectional area defined by the bore of the path main body 93 is set to be much smaller than the annular sectional area in the radial direction of the above-described annular conveyance path 53.

In the present embodiment, if the screw 21 is disassembled by detaching the tubes 39 on which the flights 84 and 86 are formed from the axis of rotation 38, the tubes 39 on which at least parts of the flights 84 and 86 are formed can also be referred to as the above-described screw elements.

Thus, the screw main body 37 of the screw 21 can be formed by sequentially disposing the tubes 39 as the screw elements on the outer circumference of the axis of rotation 38. Therefore, the conveyance portions 81 and the barrier portions 82 can be exchanged and rearranged in accordance with, for example, the degree of kneading of raw materials, and the exchange and the rearrangement can be easily performed.

Moreover, by constricting the tubes 39 in the axial direction of the second axial portion 41 and firmly affixing the end faces of the tubes 39 to each other, the path main body 93 of each of the paths 88 is formed, and the entrance 91 and the exit 92 of each of the paths 88 are integrally connected through the path main body 93. Thus, in order to form the paths 88 in the screw main body 37, it suffices that each of the tubes 39 having a length much shorter than the total length of the screw main body 37 is processed. Thus, the paths 88 are easily processed and handled when being formed.

According to a continuous high shearing processing apparatus 1 having the above-described structure, a first extruder 2 preliminarily kneads resins. The resins melted by the kneading become raw materials having flowability, and are continuously supplied from the first extruder 2 to the conveyance path 53 through the supply port 34 of a second extruder 3.

As indicated by arrow C in FIG. 17, the raw materials supplied to the second extruder 3 are introduced to the outer circumferential surface of the conveyance portion 81 positioned on the basal end side of the screw main body 37. At this time, if the screw 21 rotates left-handed in an anticlockwise direction from the perspective of the basal end of the screw main body 37, the flights 84 of the conveyance portions 81 continuously convey the raw materials toward the tip of the screw main body 37 as indicated by solid-line arrows in FIG. 17.

At this time, shearing action, caused by a difference in speed between the flights 84 rotating along the conveyance path 53 and the inner circumferential surface of the cylinder portion 33, is imparted to the raw materials, and the raw materials are stirred by a subtle twist of the flights 84. As a result, the raw materials are kneaded thoroughly, and the dispersion of macromolecular components of the raw materials progresses.

The raw materials, which have been subjected to shearing action, reach boundaries between the conveyance portions 81 and the barrier portions 82 along the conveyance path 53. The flights 86 of the barrier portions 82 are twisted left-handed to convey raw materials from the tip toward the basal end of the screw main body 37 when the screw 21 rotates left-handed. As a result, the conveyance of raw materials is stopped by the flights 86. In other words, when the screw 21 rotates left-handed, the flights 86 of the barrier portions 82 prevent raw materials from passing through the clearance between the barrier portions 82 and the inner circumferential surface of the cylinder portion 33 by limiting the flow of raw materials conveyed by the flights 84.

At this time, the pressure on the raw materials is increased at the boundaries between the conveyance portions 81 and the barrier portions 82. Specifically, FIG. 18 shows the filling rate of raw materials at the places in the conveyance path 53, which correspond to the conveyance portions 81 of the screw main body 37, with gradations. That is, in the conveyance path 53, the filling rate of raw materials becomes greater as the tone becomes darker. As is clear from FIG. 18, the filling rate of raw materials becomes greater as they approach the barrier portions 82 in the conveyance path 53 corresponding to the conveyance portions 81, and just before the barrier portions 82, the filling rate of raw materials is 100%.

Thus, just before the barrier portions 82, a "raw-material receiver R" in which the filling rate of raw materials is 100% is formed. In the raw-material receiver R, the flow of raw materials is stopped, and thus, the pressure on the raw materials is increased. As indicated by broken-line arrows in FIG. 17 and FIG. 18, the raw materials, the pressure on which has been increased, continuously flow into the path main body 93 from the entrance 91 opening in the downstream ends of the conveyance portions 81, and continuously flow through the path main body 93 from the basal end toward the tip of the screw main body 37.

As described above, the path sectional area defined by the bore of the path main body 93 is much smaller than the annular sectional area of the conveyance path 53 in the radial direction of the cylinder portion 33. From another point of view, a widening area based on the bore of the path main body 93 is much smaller than that of the annular conveyance path 53. Therefore, raw materials are rapidly squeezed when flowing from the entrance 91 into the path main body 93, and thus, extension action is imparted to the raw materials.

Moreover, since the path sectional area is sufficiently smaller than the annular sectional area, raw materials collecting in the raw-material receiver R do not disappear. That is, some of the raw materials collecting in the raw-material receiver R continuously flow into the entrance 91. In the meantime, new raw materials are fed toward the barrier portions 82 by the flights 84. As a result, the filling rate just before the barrier portions 82 in the raw-material receiver R is thereby kept at 100% all the time. At this time, even if the amount of raw materials conveyed by the flights 84 somewhat changes, the change is absorbed by raw materials remaining in the raw-material receiver R. Raw materials can be thereby continuously and stably supplied to the paths 88. Thus, in the paths 88, extension action can be uninterruptedly and continuously imparted to the raw materials.

The raw materials which have passed through the path main body 93 flow out of the exit 92 as indicated by solid-line arrows in FIG. 18. The raw materials are thereby continuously returned to the outer circumferential surfaces of the other conveyance portions 81 adjacent to the barrier portions 82 on the tip side of the screw main body 37. The returned raw materials are continuously conveyed in the direction of the tip of the screw main body 37 by the flights 84 of the other conveyance portions 81, and are subjected to shearing action again in the process of being conveyed. The raw materials, which have been subjected to shearing action, continuously flow into the path main body 93 from the entrance 91, and are subjected to extension action again in the process of flowing through the path main body 93.

In the present embodiment, the conveyance portions 81 and the barrier portions 82 are alternately arranged in the axial direction of the screw main body 37, and the paths 88 are arranged with a space therebetween in the axial direction of the screw main body 37. Thus, the raw materials introduced to the screw main body 37 from the supply port 34 are continuously conveyed from the basal end toward the tip of the screw main body 37 while being alternately and repeatedly subjected to shearing action and extension action as indicated by arrows in FIG. 17 and FIG. 18. Thus, the degree of kneading of raw materials is increased, and the dispersion of macromolecular components of the raw materials is promoted.

Then, the raw materials which have reached the tip of the screw main body 37 become sufficiently kneaded materials, and are continuously supplied to a third extruder 4 from a discharge port 36a, and gaseous materials and other volatile components included in the kneaded materials are continuously removed from the kneaded materials.

As described above, according to the third embodiment, the completely continuous production, not apparently continuous production, of kneaded materials is enabled. That is, resin preliminarily kneaded by the first extruder 2 continues being uninterruptedly supplied to the second extruder 3, and thus, the flow of resin does not temporarily stagnate inside the first extruder 2. Thus, temperature change, viscosity change, or phase change of the resin, caused when the kneaded resin stagnates inside the first extruder 2, can be prevented. As a result, raw materials having uniform quality all the time can be supplied to the second extruder 3 from the first extruder 2.

Furthermore, according to the third embodiment, the lengths of shearing action regions and extension action regions for raw materials in the axial direction can be set individually. Thus, the optimum number of times shearing action and extension action are imparted and the optimum time for which shearing action and extension action are imparted for kneading raw materials can be set.

Moreover, according to the third embodiment, the paths 88 imparting extension action to raw materials extend in the axial direction of the screw main body 37 at positions eccentric to the axial line O1, which is the center of rotation of the screw main body 37. Thus, the paths 88 revolve around the axial line O1. In other words, the tubular wall surfaces 89 defining the paths 88 revolve around the axial line O1 without rotating on the axial line O1.

Accordingly, when raw materials pass through the paths 88, the raw materials are not actively stirred inside the paths 88. Therefore, the raw materials passing through the paths 88 are hardly subjected to shearing action, and the raw materials passing through the paths 88 and returning to the outer circumferential surfaces of the conveyance portions 81 are mainly subjected to extension action. Therefore, also in the screw 21 of the third embodiment, places where shearing action is imparted to raw materials and places where extension action is imparted to raw materials can be clearly determined.

Here, results of a high dispersion verification test performed on kneaded materials in the case where raw materials are kneaded while shearing action and extension action are alternately imparted to them by the above-described completely continuous production will be described.

In the test, two kinds of materials, a polycarbonate (PC) resin and a polymethyl methacrylate (PMMA) resin, are supplied to the first extruder 2, in which the effective length (L/D) of a kneading portion 12 with respect to the screw effective length (L/D) 50 is set at 7.9, and materials in a melted state are produced by preliminarily kneading them. In addition, the materials in a melted state are continuously supplied from the first extruder 2 to the second extruder 3 as raw materials of the second extruder 3.

In the test, the screw 21 is configured to repeat the above-described shearing and extension operation eight times. Further, the specifications of the screw 21 are set as follows: the screw diameter is set at 36 mm, the screw effective length (L/D) is set at 16.7, the screw rotational rate is set at 2,300 rpm, the supply of raw materials is set at 10.0 kg/h, and the barrel set temperature is set at 240° C.

Through the above-described test, intended transparent kneaded materials were continuously obtained.

Fourth Embodiment

FIG. 19 to FIG. 27 show a fourth embodiment. The fourth embodiment differs from the first embodiment in the matters related to a screw main body 37. The other structures of a screw 21 are basically the same as those of the first embodiment. Therefore, in the fourth embodiment, the same structural portions as those of the first embodiment will be given the same reference numbers, and description thereof will be omitted.

Figure 19:
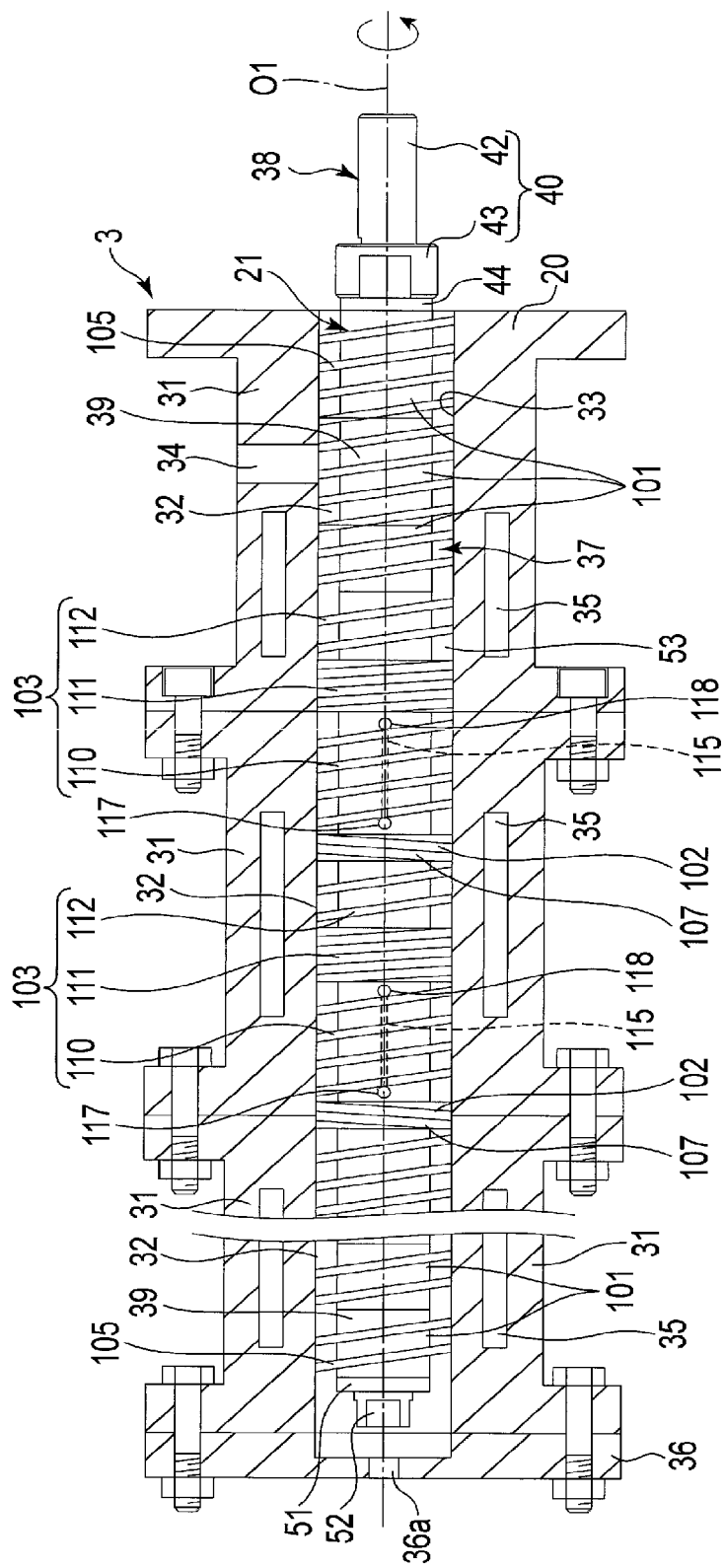
FIG. 19 is a sectional view of a second extruder used in a fourth embodiment.
Figure 20:
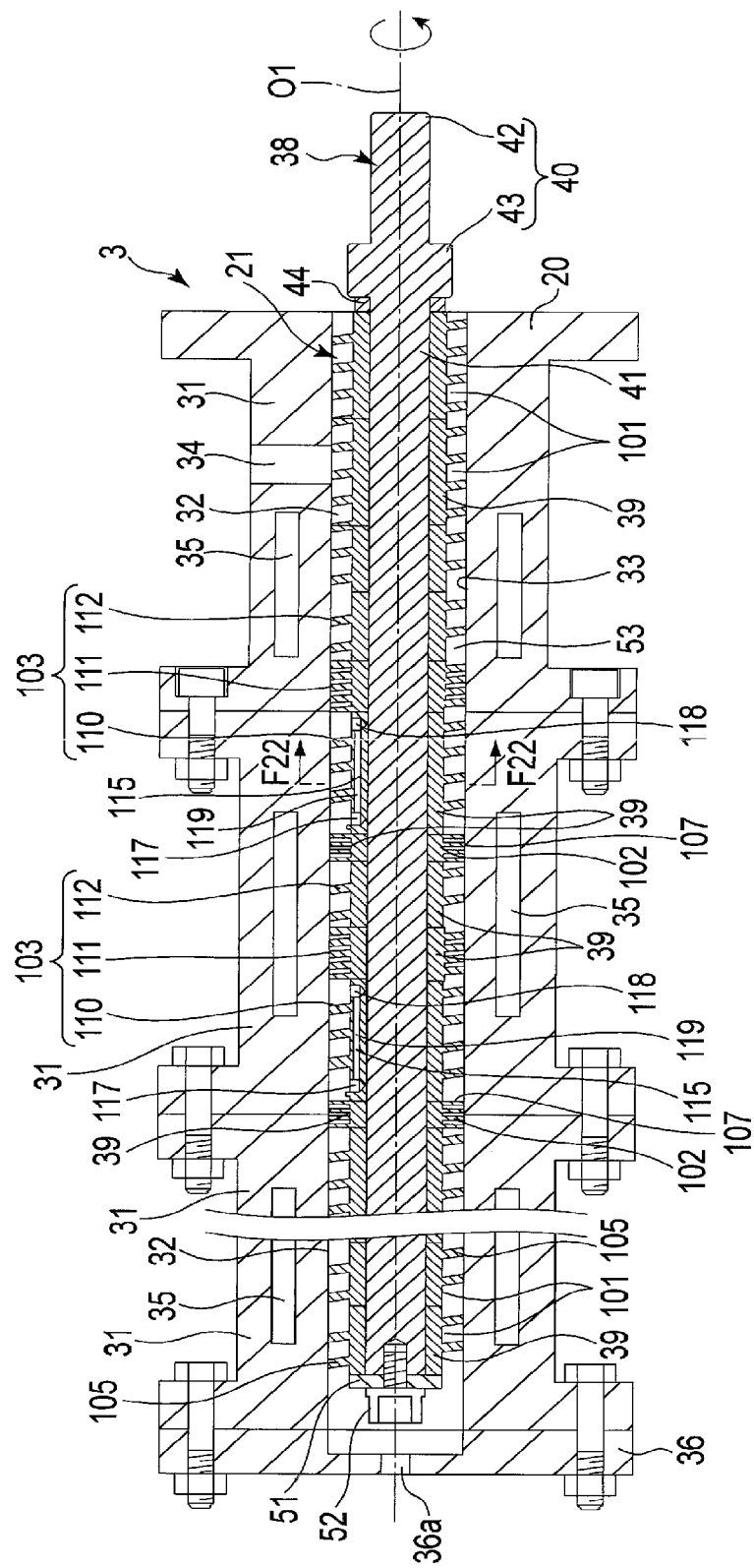
FIG. 20 is a sectional view of the second extruder sectionally showing both a barrel and a screw in the fourth embodiment.
Figure 21:
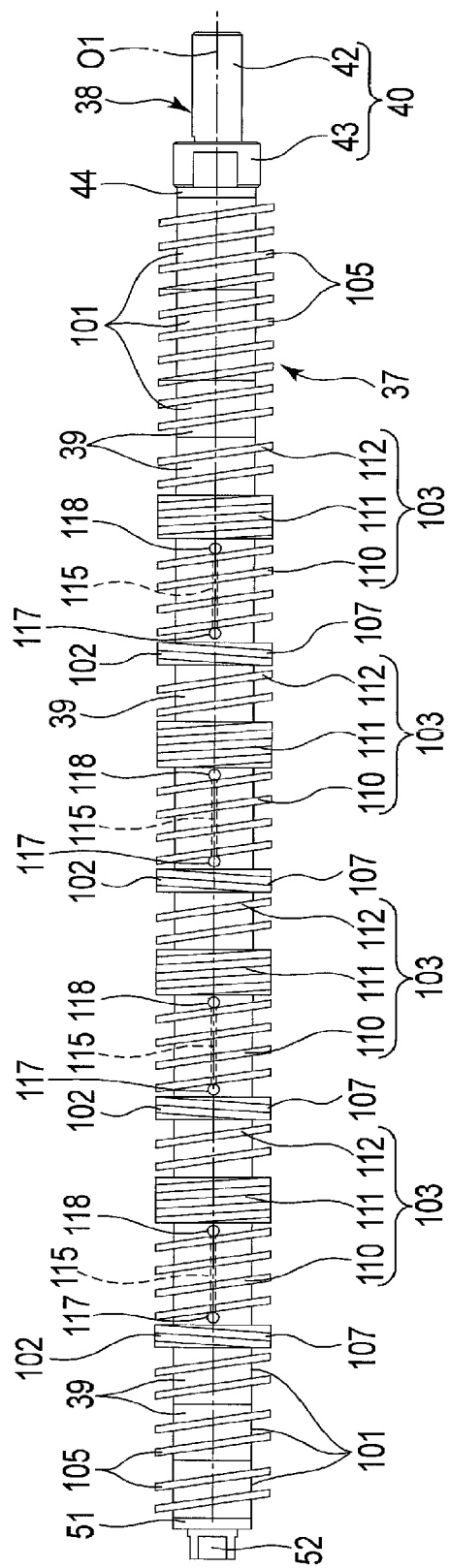
FIG. 21 is a side view of the screw used in the fourth embodiment.

As shown in FIG. 19 to FIG. 21, cylindrical tubes 39 constituting the screw main body 37 are constricted in the axial direction of a second axial portion 41 between a first collar 44 and a second collar 51, and the end faces of the adjacent tubes 39 are firmly affixed to each other without any gap as in the first embodiment.

At this time, all the tubes 39 are coaxially joined on the second axial portion 41, and each of the tubes 39 and an axis of rotation 38 are integrally assembled. This makes it possible to rotate each of the tubes 39 on an axial line O1 together with the axis of rotation 38, that is, rotate the screw main body 37 on the axial line O1.

In such a state, each of the tubes 39 serves as a structural element that defines the outside diameter D1 (see FIG. 22) of the screw main body 37. That is, the outside diameters D1 of the tubes 39 coaxially joined along the second axial portion 41 are set to be equal to each other. The outside diameter D1 of the screw main body 37 (each of the tubes 39) is defined as a diameter passing through the axial line O1, which is the center of rotation of the axis of rotation 38.

The segmental screw 21 in which the outside diameter D1 of the screw main body 37 (each of the tubes 39) is a fixed value is thereby formed. In the segmental screw 21, screw elements can be held in free order and combination along the axis of rotation 38 (that is, the second axial portion 41). With respect to the screw elements, for example, each of the tubes 39 on which at least parts of flights 105, 107, 110, 111, and 112, which will be described later, are formed can be defined as one screw element.

In this manner, by segmenting the screw 21, its convenience can be significantly improved with respect to, for example, changes and adjustments to the specifications or the upkeep and maintenance of the screw 21.

Moreover, the segmental screw 21 is coaxially accommodated in a cylinder portion 33 of a barrel 20. Specifically, the screw main body 37 with the screw elements held along the axis of rotation 38 (the second axial portion 41) is rotatably accommodated in the cylinder portion 33. In this state, a first axial portion 40 (a joint portion 42 and a stopper portion 43) of the axis of rotation 38 projects from one end portion of the barrel 20 to the outside of the barrel 20.

Moreover, in this state, a conveyance path 53 for conveying raw materials is formed between the outer circumferential surface in the circumferential direction of the screw main body 37 and the inner circumferential surface of the cylinder portion 33. The conveyance path 53 has an annular sectional shape in the radial direction of the cylinder portion 33, and extends in the axial direction of the cylinder portion 33.

As shown in FIG. 19 to FIG. 21, the screw main body 37 comprises conveyance portions 101 for conveying raw materials, barrier portions 102 for limiting the flow of raw materials, and circulation portions 103 temporarily circulating raw materials. To be specific, conveyance portions 101 are disposed at the basal end of the screw main body 37, which corresponds to the one end portion of the barrel 20, and conveyance portions 101 are disposed at the tip of the screw main body 37, which corresponds to the other end portion of the barrel 20. Moreover, between the conveyance portions 101, the circulation portions 103 and the barrier portions 102 are alternately disposed in the axial direction from the basal end toward the tip of the screw main body 37.

A supply port 34 of the barrel 20 opens toward the conveyance portion 101 disposed on the basal end side of the screw main body 37.

Each of the conveyance portions 101 comprises the flight 105 spirally twisted. The flight 105 projects from the outer circumferential surface in the circumferential direction of the tubes 39 toward the conveyance path 53. The flight 105 is twisted to convey raw materials from the basal end toward the tip of the screw main body 37 when the screw 21 rotates left-handed in an anticlockwise direction from the perspective of the basal end of the screw main body 37. That is, the flight 105 is twisted right-handed as in the case of a right-handed screw.

Each of the barrier portions 102 comprises the flight 107 spirally twisted. The flight 107 projects from the outer circumferential surface in the circumferential direction of the tubes 39 toward the conveyance path 53. The flight 107 is twisted to convey raw materials from the tip toward the basal end of the screw main body 37 when the screw 21 rotates left-handed in an anticlockwise direction from the perspective of the basal end of the screw main body 37. That is, the flight 107 is twisted left-handed as in the case of a left-handed screw.

The circulation portions 103 are adjacent to the barrier portions 102 from the basal end side of the axis of rotation 38. Each of the circulation portions 103 comprises the first to third flights 110, 111, and 112 spirally twisted. The first to third flights 110, 111, and 112 each project from the outer circumferential surface in the circumferential direction of the tubes 39 toward the conveyance path 53.

The first to third flights 110, 111, and 112 are disposed to be adjacent to each other in the axial direction of the screw main body 37. The first to third flights 110, 111, and 112 are twisted to convey raw materials from the basal end toward the tip of the screw main body 37 when the screw 21 rotates left-handed in an anticlockwise direction from the perspective of the basal end of the screw main body 37. That is, the first to third flights 110, 111, and 112 are twisted right-handed as in the case of a right-handed screw.

In this case, the twist pitch of the flight 107 of each of the barrier portions 102 is set to be smaller than or equal to those of the flights 105 of the conveyance portions 101 and the flights 110, 111, and 112 of the circulation portions 103. Furthermore, the twist pitch of the second flights 111 is set to be smaller than those of the first and third flights 110 and 112. Moreover, a slight clearance is secured between the apexes of the flights 105, 107, 110, 111, and 112 and the inner circumferential surface of the cylinder portion 33 of the barrel 20.

Further, of the first to third flights 110, 111, and 112, the third flights 112 are disposed on the upstream side in the conveyance direction, and the first flights 110 are disposed on the downstream side in the conveyance direction. The second flights 111 are disposed between the third flights 112 and the first flights 110.

In the present embodiment, each of the barrier portions 102 is designed, such that raw materials can flow over each of the barrier portions 102. Specifically, each of the barrier portions 102 is designed, such that raw materials can pass through a space between each of the barrier portions 102 and the cylinder portion 33 in a state in which the screw 21 is rotatably inserted in the cylinder portion 33 of the barrel 20. In this case, the clearance between the outside diameter portion of each of the barrier portions 102 (the apexes of the flights 107) and the inner circumferential surface of the cylinder portion 33 is preferably set to be within a range of 0.1 to 3 mm. More preferably, the clearance is set to be within a range of 0.1 to 1.5 mm.

Here, the lengths of the conveyance portions 101 in the axial direction of the screw main body 37 are set as appropriate in accordance with, for example, the kind of raw materials, the degree of kneading of raw materials, and the production of kneaded materials per unit time. The conveyance portions 101 are at least areas where the flights 105 are formed on the outer circumferential surfaces of the tubes 39, but are not limited to areas between the start points and the end points of the flights 105.

That is, areas outside the flights 105 of the outer circumferential surfaces of the tubes 39 may be regarded as the conveyance portions 101. For example, if a cylindrical spacer or a cylindrical collar is disposed at a position adjacent to the tubes 39 comprising the flights 101, the spacer or the collar also can be included in the conveyance portions 101.

Moreover, the lengths of the barrier portions 102 in the axial direction of the screw main body 37 are set as appropriate in accordance with, for example, the kind of raw materials, the degree of kneading of raw materials, and the production of kneaded materials per unit time. The barrier portions 102 according to the present embodiment function to stop the flow of raw materials fed by the conveyance portions 101 and allow some of the raw materials to flow over the barrier portions 102.

Moreover, in the above-described screw 21, each of the flights 105, 107, 110, 111, and 112 projects from the outer circumferential surfaces of the tubes 39 having the outside diameters D1 equal to each other toward the conveyance path 53. Thus, the outer circumferential surface in the circumferential direction of each of the tubes 39 defines the root diameter of the screw 21. The root diameter of the screw 21 is kept at a fixed value over the total length of the screw 21.

As shown in FIG. 19 to FIG. 21, the screw main body 37 comprises paths 115 extending in the axial direction of the screw main body 37. The paths 115 are formed in the tubes 39 of the respective circulation portions 103. In this case, the paths 115 are arranged at predetermined intervals (for example, regular intervals) in the same straight line in the axial direction of the screw main body 37.

Moreover, the paths 115 are provided at positions eccentric to the axial line O1 of the axis of rotation 38 inside the tubes 39. In other words, the paths 115 are shifted from the axial line O1, and revolve around the axial line O1 when the screw main body 37 rotates.

Figure 22:
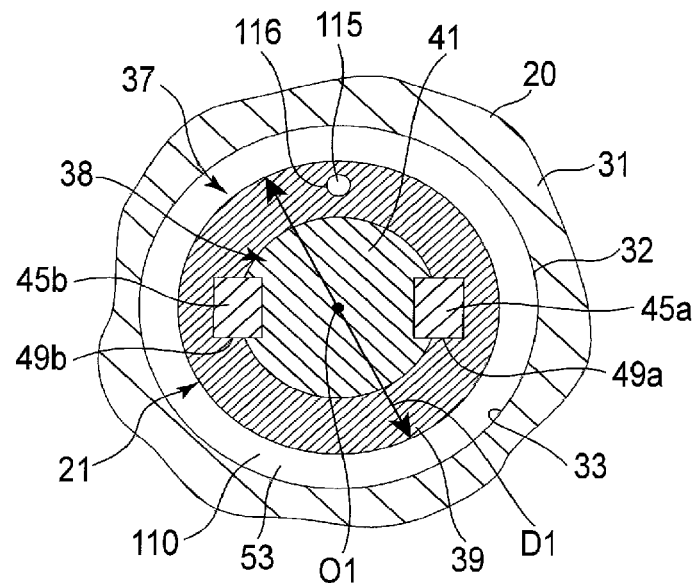
FIG. 22 is a sectional view along line F22-F22 of FIG. 20.
Figure 23:
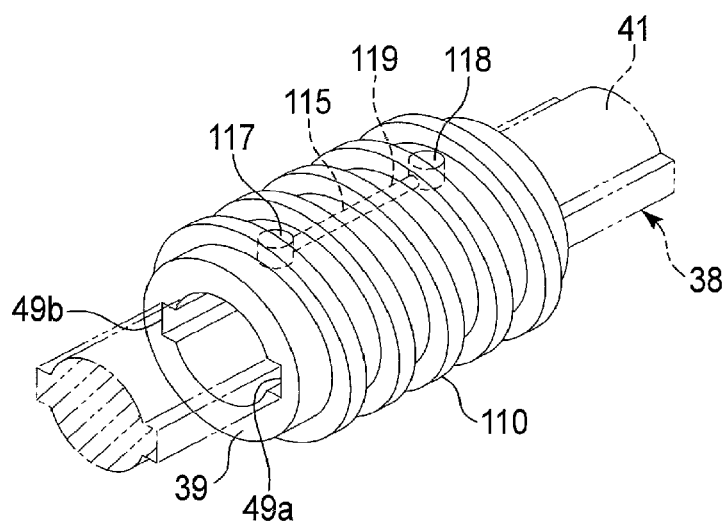
FIG. 23 is a perspective view of a tube used in the fourth embodiment.

As shown in FIG. 22, the paths 115 are, for example, holes having a circular sectional shape. The inside diameter of the holes is, for example, set to be greater than or equal to 1 mm but less than 6 mm, and preferably, greater than or equal to 1 mm but less than 5 mm. Moreover, the tubes 39 of the circulation portions 103 comprise tubular wall surfaces 116 defining the holes. That is, the paths 115 are holes composed of hollow spaces only, and the wall surfaces 116 continuously surround the hollow paths 115 in the circumferential direction. The paths 115 are thereby formed as hollow spaces which allow only the flow of raw materials. In other words, inside the paths 115, there are no other elements constituting the screw main body 37. Moreover, the wall surfaces 116 revolve around the axial line O1 without rotating on the axial line O1, when the screw main body 37 rotates.

Figure 27:
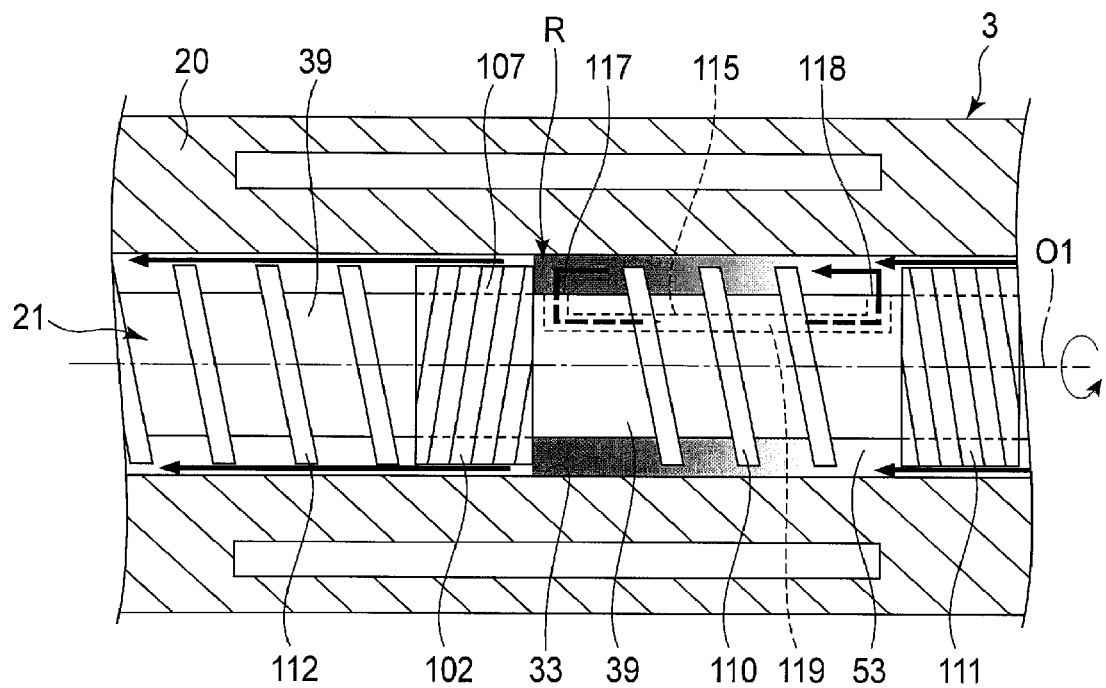
FIG. 27 is a sectional view of the second extruder schematically showing the flow direction of raw materials when the screw rotates in the fourth embodiment.

As shown in FIG. 19, FIG. 20, and FIG. 27, each of the paths 115 comprises an entrance 117, an exit 118, and a path main body 119 connecting the entrance 117 and the exit 118. The entrance 117 and the exit 118 are opened in the outer circumferential surfaces of the tubes 39 constituting the circulation portions 103. The figures show an example of the paths 115. In the paths 115, the path main body 119 is provided in the tubes 39 on which the first flights 110 are formed, and the entrance 117 and the exit 118 are opened in the outer circumferential surfaces of the tubes 39. The positions where the entrance 117 and the exit 118 are opened can be freely set within the outer circumferential surfaces of the tubes 39.

The path main body 119 extends straight without branching on the way in the axial direction of the screw main body 37. The figures show, as an example, a state in which the path main body 119 extends parallel to the axial line O1. Both sides of the path main body 119 are closed in the axial direction.

The entrance 117 is provided on one side of the path main body 119, that is, a portion closer to the tip of the screw main body 37. In this case, the entrance 117 may be opened in the outer circumferential surface of the screw main body 37 from an end face on the one side of the path main body 119, or may be opened in the outer circumferential surface of the screw main body 37 from a portion closer to the end face on the one side of the path main body 119, that is, a portion located short of the end face. The opening direction of the entrance 117 is not limited to those orthogonal to the axial line O1, but may be those crossing the axial line O1. In this case, entrances 117 may be provided by opening one side of the path main body 119 in directions.

The exit 118 is provided on the other side (the opposite side to the one side) of the path main body 119, that is, a portion closer to the basal end of the screw main body 37. In this case, the exit 118 may be opened in the outer circumferential surface of the screw main body 37 from an end face on the other side of the path main body 119, or may be opened in the outer circumferential surface of the screw main body 37 from a portion closer to the end face on the other side of the path main body 119, that is, a portion located short of the end face. The opening direction of the exit 118 is not limited to those orthogonal to the axial line O1, but may be those crossing the axial line O1. In this case, exits 118 may be provided by opening one side of the path main body 119 in directions.

The path main body 119 connecting the entrance 117 and the exit 118 has a length stretching over the tube 39 on which the first flight 110 is formed in each of the circulation portions 103. In this case, the bore of the path main body 119 may be set to be smaller than those of the entrance 117 and the exit 118, or may be set to be equal to them. In either case, the path sectional area defined by the bore of the path main body 119 is set to be much smaller than the annular sectional area in the radial direction of the above-described annular conveyance path 53.

In the present embodiment, if the screw 21 is disassembled by detaching the tubes 39 on which the flights 105, 107, 110, 111, and 112 are formed from the axis of rotation 38, the tubes 39 on which at least parts of the flights 105, 107, 110, 111, and 112 are formed can also be referred to as the above-described screw elements.

Thus, the screw main body 37 of the screw 21 can be formed by sequentially disposing the tubes 39 as the screw elements on the outer circumference of the axis of rotation 38. Therefore, the conveyance portions 101 and the barrier portions 102 can be exchanged and rearranged in accordance with, for example, the degree of kneading of raw materials, and the exchange and the rearrangement can be easily performed.

Moreover, by constricting the tubes 39 in the axial direction of the second axial portion 41 and firmly affixing the end faces of the adjacent tubes 39 to each other, the path main body 119 of each of the paths 115 is formed, and the entrance 117 and the exit 118 of each of the paths 115 are integrally connected through the path main body 119. Thus, in order to form the paths 115 in the screw main body 37, it suffices that each of the tubes 39 having a length much shorter than the total length of the screw main body 37 is processed. Thus, the paths 115 are easily processed and handled when being formed.

Figure 24:
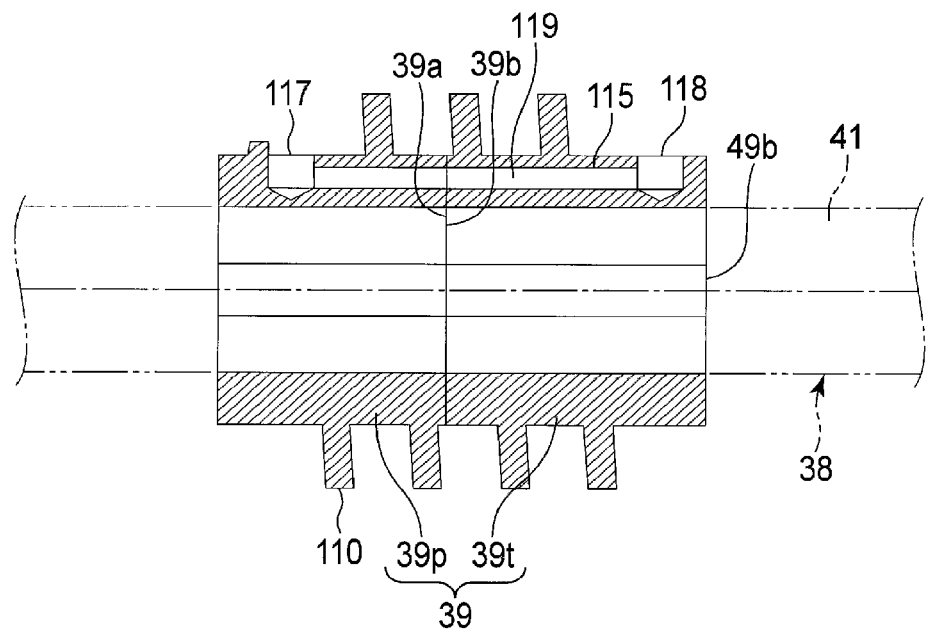
FIG. 24 is a transverse sectional view of the tube shown in FIG. 23.

As shown in FIG. 24, the tube 39 on which the first flight 110 is formed is divided into two, such that the path main body 119 of the path 115 is divided. In one tube 39t, a lateral hole bored in the axial direction from a division surface 39a communicates with the exit 118. In the other tube 39p, a lateral hole bored in the axial direction from a division surface 39b communicates with the entrance 117. In this structure, the one continuous path 115, both ends of which are opened in the outer circumferential surface of the tube 39, is formed by bringing the division surfaces 39a and 39b into contact with each other.

Figure 25:
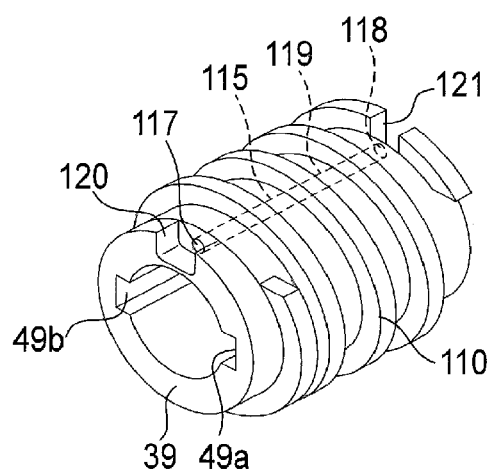
FIG. 25 is a perspective view showing another structural example of the tube used in the fourth embodiment.

As another path 115, a path 115 may be formed to penetrate the tube 39 of the first flight 110 in the axial direction, for example, as shown in FIG. 25. In this case, the entrance 117 and the exit 118 of the path 115 are opened in the inner surfaces of an entrance groove 120 and an exit groove 121 formed by cutting out parts of both the end faces in the axial direction of the tube 39 into the shape of depressions. According to this structure, even if the tube 39 is not divided, the one continuous path 115 can be formed simply by making a lateral hole penetrate the tube 39.

According to a continuous high shearing processing apparatus 1 having the above-described structure, a first extruder 2 preliminarily kneads resins. The resins melted by the kneading become raw materials having flowability, and are continuously supplied from the first extruder 2 to the conveyance path 53 through the supply port 34 of a second extruder 3.

Figure 26:
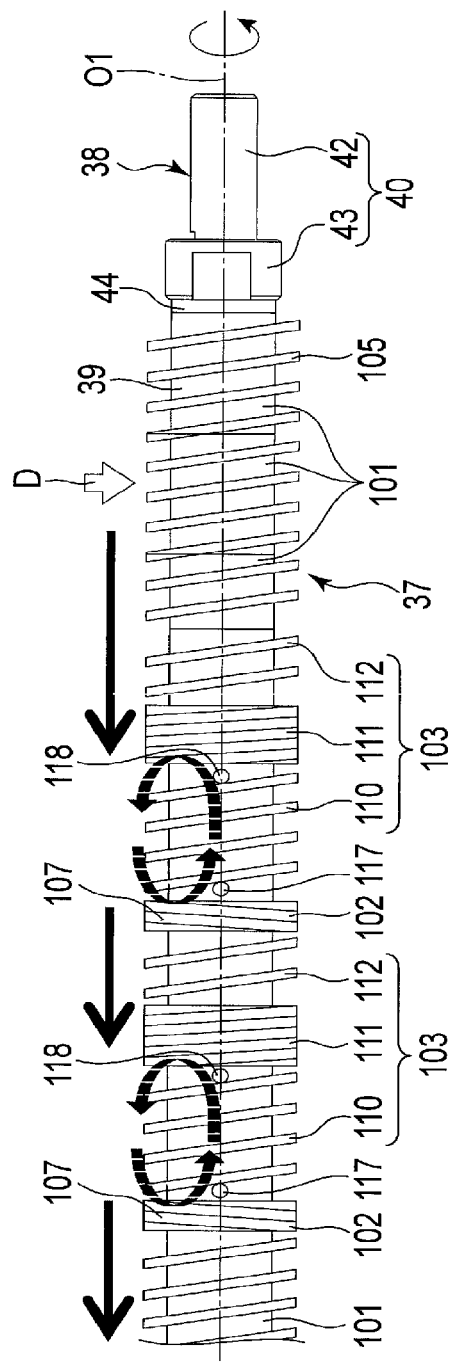
FIG. 26 is a side view showing a flow direction of raw materials with respect to the screw in the fourth embodiment.

As indicated by arrow D in FIG. 26, the raw materials supplied to the second extruder 3 are introduced to the outer circumferential surface of the conveyance portion 101 positioned on the basal end side of the screw main body 37. At this time, if the screw 21 rotates left-handed in an anticlockwise direction from the perspective of the basal end of the screw main body 37, the flights 105 of the conveyance portions 101 continuously convey the raw materials toward the tip of the screw main body 37 as indicated by solid-line arrows in FIG. 26.

Then, the raw materials which have reached the circulation portions 103 are further continuously conveyed in the direction of the tip of the screw main body 37 by the first to third flights 110, 111, and 112 of the circulation portions 103 as indicated by solid-line arrows in FIG. 26 and FIG. 27.

In the meantime, shearing action, caused by a difference in speed between the flights 105, 110, 111, and 112 rotating along the conveyance path 53 and the inner circumferential surface of the cylinder portion 33, is imparted to the raw materials, and the raw materials are stirred by a subtle twist of the flights 105, 110, 111, and 112. As a result, the raw materials are kneaded thoroughly, and the dispersion of macromolecular components of the raw materials progresses.

The raw materials, which have been subjected to shearing action, reach boundaries between the circulation portions 103 and the barrier portions 102 along the conveyance path 53. In other words, the raw materials are fed to the boundaries between the circulation portions 103 and the barrier portions 102 by the first flights 110 disposed on the downstream side in the conveyance direction. On the other hand, when the screw 21 rotates left-handed, the flights 107 of the barrier portions 102 convey raw materials from the tip toward the basal end of the screw main body 37.

As a result, raw materials fed by the first flights 110 are stopped by the flights 107. In other words, when the screw 21 rotates left-handed, the flights 107 of the barrier portions 102 limit the flow of raw materials fed by the first flights 110.

At this time, the pressure on the raw materials is increased at the boundaries between the circulation portions 103 and the barrier portions 102. Specifically, FIG. 27 shows the filling rate of raw materials at the places in the conveyance path 53, which correspond to the path 115, with gradations. That is, in the conveyance path 53, the filling rate of raw materials becomes greater as the tone becomes darker. As is clear from FIG. 27, the filling rate of raw materials becomes greater as they approach the barrier portions 102 in the conveyance path 53 corresponding to the paths 115, and just before the barrier portions 102, the filling rate of raw materials is 100%.

Thus, just before the barrier portions 102, a "raw-material receiver R" in which the filling rate of raw materials is 100% is formed. In the raw-material receiver R, the flow of raw materials is stopped, and thus, the pressure on the raw materials is increased. As indicated by broken-line arrows in FIG. 26 and FIG. 27, the raw materials, the pressure on which has been increased, continuously flow into the path main body 119 from the entrance 117, and continuously flow through the path main body 119 from the tip toward the basal end of the screw main body 37. At this time, the flow direction of raw materials in the path main body 119 is opposite to that of raw materials fed by the flights 105, 110, 111, and 112.

As described above, the path sectional area defined by the bore of the path main body 119 is much smaller than the annular sectional area of the conveyance path 53 in the radial direction of the cylinder portion 33. From another point of view, a widening area based on the bore of the path main body 119 is much smaller than that of the annular conveyance path 53. Therefore, raw materials are rapidly squeezed when flowing from the entrance 117 into the path main body 119, and thus, extension action is imparted to the raw materials.

Moreover, since the path sectional area is sufficiently smaller than the annular sectional area, raw materials collecting in the raw-material receiver R do not disappear. That is, some of the raw materials collecting in the raw-material receiver R continuously flow into the entrance 117. In the meantime, new raw materials are fed toward the barrier portions 102 by the first flights 110. As a result, the filling rate just before the barrier portions 102 in the raw-material receiver R is thereby kept at 100% all the time. At this time, even if the amount of raw materials conveyed by the first flights 110 somewhat changes, the change is absorbed by raw materials remaining in the raw-material receiver R. Raw materials can be thereby continuously and stably supplied to the paths 115. Thus, in the paths 115, extension action can be uninterruptedly and continuously imparted to the raw materials.

The raw materials which have passed through the path main body 119 flow out of the exit 118 as indicated by solid-line arrows in FIG. 27. The raw materials are thereby continuously returned to the outer circumferential surfaces of the circulation portions 103. The returned raw materials are continuously conveyed toward the barrier portions 102 adjacent on the tip side of the screw main body 37 by the first flights 110, and are subjected to shearing action again in the process of being conveyed.

In this case, the portions on which the second flights 111 are formed can be given a backflow prevention function by setting the twist pitch of the second flights 111 smaller than that of the first flights 110. This makes it possible to convey raw materials which have been returned from the exit 118 to the circulation portions 103 toward the barrier portions 102 without making them flow back.

In the present embodiment, some of the raw materials conveyed toward the barrier portions 102 are continuously guided again from the entrance 117 to the paths 115, and temporarily repeat circulation at the circulation portions 103. The other raw materials conveyed toward the barrier portions 102 pass through the clearance between the apexes of the flights 107 of the barrier portions 102 and the inner circumferential surface of the cylinder portion 33, and continuously flow into the adjacent circulation portions 103.

The barrier portions 102 and the circulation portions 103 are alternately arranged in the axial direction of the screw main body 37, and the paths 115 provided at the positions corresponding to the first flights 110 of the circulation portions 103 are arranged with a space therebetween in the axial direction of the screw main body 37. Thus, the raw materials supplied to the screw main body 37 from the supply port 34 are continuously conveyed from the basal end toward the tip of the screw main body 37 while being alternately and repeatedly subjected to shearing action and extension action. Thus, the degree of kneading of raw materials is increased, and the dispersion of macromolecular components of the raw materials is promoted.

Then, the raw materials which have reached the tip of the screw main body 37 become sufficiently kneaded materials, and are continuously supplied to a third extruder 4 from a discharge port 36a, and gaseous materials and other volatile components included in the kneaded materials are continuously removed from the kneaded materials.

As described above, according to the fourth embodiment, the completely continuous production, not apparently continuous production, of kneaded materials is enabled. That is, resin preliminarily kneaded by the first extruder 2 continues being uninterruptedly supplied to the second extruder 3, and thus, the flow of resin does not temporarily stagnate inside the first extruder 2. Thus, temperature change, viscosity change, or phase change of the resin, caused when the kneaded resin stagnates inside the first extruder 2, can be prevented. As a result, raw materials having uniform quality all the time can be supplied to the second extruder 3 from the first extruder 2.

Furthermore, according to the fourth embodiment, shearing action and extension action can be alternately imparted to raw materials several times by the circulation portions 103 in which the paths 115 are formed. In this case, the number of times shearing action and extension action are imparted to raw materials can be further increased by disposing the circulation portions 103 in the axial direction.

Moreover, according to the fourth embodiment, the paths 115 imparting extension action to raw materials extend in the axial direction of the screw main body 37 at positions eccentric to the axial line O1, which is the center of rotation of the screw main body 37. Thus, the paths 115 revolve around the axial line O1. In other words, the tubular wall surfaces 116 defining the paths 115 revolve around the axial line O1 without rotating on the axial line O1.

Accordingly, when raw materials pass through the paths 115, the raw materials are not actively stirred inside the paths 115. Therefore, the raw materials passing through the paths 115 are hardly subjected to shearing action, and the raw materials passing through the paths 115 and returning to the outer circumferential surfaces of the conveyance portions 103 are mainly subjected to extension action. Therefore, also in the screw 21 of the fourth embodiment, places where shearing action is imparted to raw materials and places where extension action is imparted to raw materials can be clearly determined.

Here, results of a high dispersion verification test performed on kneaded materials in the case where raw materials are kneaded while shearing action and extension action are alternately imparted to them by the above-described completely continuous production will be described.

In the test, two kinds of materials, a polycarbonate (PC) resin and a polymethyl methacrylate (PMMA) resin, are supplied to the first extruder 2, in which the effective length (L/D) of a kneading portion 12 with respect to the screw effective length (L/D) 50 is set at 7.9, and materials in a melted state are produced by preliminarily kneading them. In addition, the materials in a melted state are continuously supplied from the first extruder 2 to the second extruder 3 as raw materials of the second extruder 3.

In the test, the screw 21 is configured, such that the above-described circulation portions 103 are disposed at three places in the axial direction and raw materials pass through each of the paths 115. Further, the specifications of the screw 21 are set as follows: the screw diameter is set at 36 mm, the screw effective length (L/D) is set at 16.7, the screw rotational rate is set at 2,500 rpm, the supply of raw materials is set at 10.0 kg/h, and the barrel set temperature is set at 240° C.

Through the above-described test, intended transparent kneaded materials were continuously obtained.

Fifth Embodiment

Figure 28:
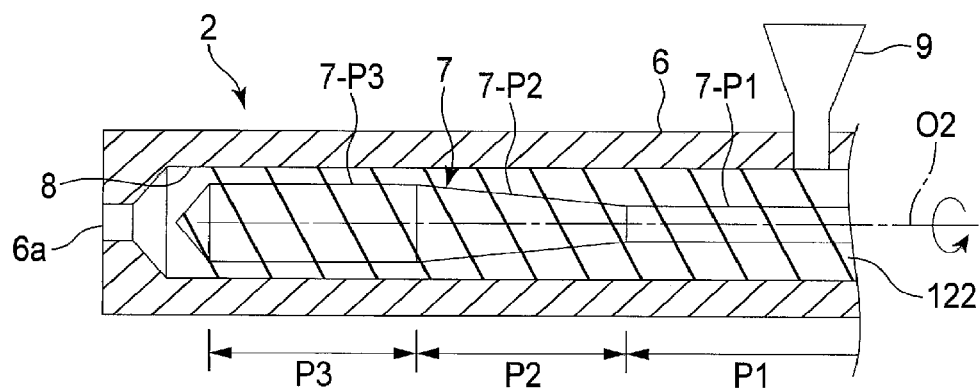
FIG. 28 is a sectional view of a first extruder according to a fifth embodiment.

FIG. 28 shows a fifth embodiment. In the above-described first embodiment, the case where a first extruder (processor)

2 is formed as a twin screw kneader has been described. In the fifth embodiment, however, the case where the first extruder 2 is formed as a single screw extruder will be assumed instead.

As shown in FIG. 28, in the first extruder 2 according to the fifth embodiment, a barrel 6 comprises a cylinder portion 8 in which a single screw 7 is rotatably accommodated. As in the above-described first embodiment, the barrel 6 is provided with a supply port 9 through which, for example, pelletized materials can be supplied to the cylinder portion 8, a heater (not shown in the figure) for melting resin, and a discharge port 6a through which the melted resin can be discharged.

The screw 7 can rotate on an axial line O2, and a spirally twisted flight 122 is formed on its outer circumferential surface. The flight 122 is configured to continuously convey resin supplied from the supply port 9 toward the discharge port 6a. Thus, the flight 122 is twisted in the opposite direction to the rotation direction of the screw 7 from the perspective of the supply port 9 side. The figure shows, as an example, the flight 122 in the case where resin is conveyed by rotating the screw 7 left-handed. In this case, the twist direction of the flight 122 is set to be clockwise as in the case of a right-handed screw.

Moreover, a supply portion P1, a compression portion P2, and a conveyance portion P3 are continuously formed on the outer circumferential surface of the screw 7 in order from the supply port 9 side toward the discharge port 6a. The supply portion P1 has a columnar shape, and a gap between its outer circumferential surface 7-P1 and the cylinder portion 8 is set wide. The conveyance portion P3 has a columnar shape, and a gap between its outer circumferential surface 7-P3 and the cylinder portion 8 is set narrow. In other words, in the conveyance portion P3, the height of the flight 122 is set small by narrowing the gap between the outer circumferential surface 7-P3 and the cylinder portion 8. The discharge stability of the discharge port 6a is thereby improved. The compression portion P2 has a shape widening from the supply portion P1 toward the conveyance portion P3, and a gap between its outer circumferential surface 7-P2 and the cylinder portion 8 is set to become continuously narrower from the supply portion P1 toward the conveyance portion P3.

Here, in a state in which the screw 7 is rotated left-handed, pelletized resin supplied from the supply port 9 to the cylinder portion 8 is conveyed by the flight 122 in the order of the supply portion P1, the compression portion P2, and the conveyance portion P3, and then discharged from the discharge port 6a. In the supply portion P1, the resin has a low temperature and is in a solid state. In the compression portion P2, the resin is mainly compressed by the gap that continuously becomes narrower while being heated by the heater. In the conveyance portion P3, the resin forms melted and mixed raw materials. Then, raw materials discharged from the discharge port 6a of the barrel 6 are continuously supplied to a second extruder 3 as indicated by arrow A in FIG. 1.

As described above, according to the fifth embodiment, even if the first extruder 2 is formed as a single screw extruder, raw materials of optimum viscosity for a kneading process performed by the second extruder 3 can be produced as in the above-described case of the twin screw kneader according to the first embodiment. The workload of the second extruder 3 can be thereby reduced.

For example, assuming that shearing action and extension action are alternately imparted to already preliminarily kneaded materials, that is, materials pelletized by incorporating a filler (additives) into resin, the materials can be kneaded without causing deterioration of the physical properties of the additives or cutting of fibers by using a single screw extruder.

In addition, if additives are added to raw materials, the physical properties of the additives may be deteriorated or the additives may be decomposed by high-speed rotation in the second extruder 3 when the additives are introduced to the first extruder 2 or the second extruder 3. In this case, if a third extruder 4 is formed as a twin screw extruder, the third extruder 4 can incorporate (knead) the additives into the raw materials as well as performing deaeration.

Sixth Embodiment

Figure 29:
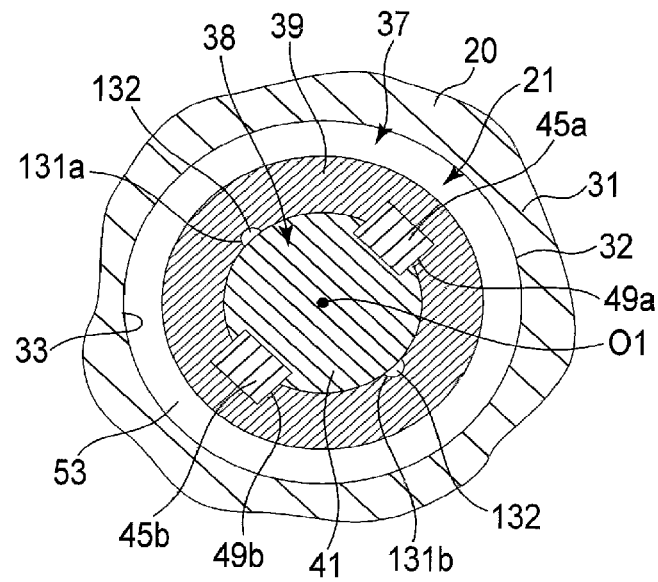
FIG. 29 is a sectional view of a second extruder according to a sixth embodiment.

FIG. 29 shows a sixth embodiment. The sixth embodiment differs from the first embodiment in the structure for imparting extension action to raw materials. The other structures of a screw 21 are basically the same as those of the first embodiment.

As shown in FIG. 29, a pair of grooves 131a and 131b is formed in the inner circumferential surface of a tube 39. The grooves 131a and 131b extend in the axial direction of a screw main body 37, and are remote from each other in the radial direction of the screw main body 37. Moreover, the grooves 131a and 131b are opened in the inner circumferential surface of the tube 39.

When the tube 39 is inserted on a second axial portion 41 of an axis of rotation 38, opening ends of the grooves 131a and 131b are closed by the outer circumferential surface of the second axial portion 41. Thus, the grooves 131a and 131b define paths 132 which impart extension action to raw materials in cooperation with the outer circumferential surface of the second axial portion 41. In the present embodiment, the paths 132 are positioned at a boundary between the axis of rotation 38 and the tube 39.

According to the sixth embodiment, the paths 132 are provided at positions eccentric to an axial line O1 of the axis of rotation 38 inside the screw main body 37. Accordingly, as in the first embodiment, the paths 132 are shifted from the axial line O1, and revolve around the axial line O1 when the screw main body 37 rotates.

In the sixth embodiment, the paths 132 are formed inside the screw main body 37 when the tube 39 is inserted on the second axial portion 41 of the axis of rotation 38. Since the grooves 131a and 131b defining the paths 132 are opened in the inner circumferential surface of the tube 39, the grooves 131a and 131b can be easily formed.

Therefore, for example, even if it becomes necessary to change the sectional shape of the paths 132, it can be easily changed.

Seventh Embodiment

Figure 30:
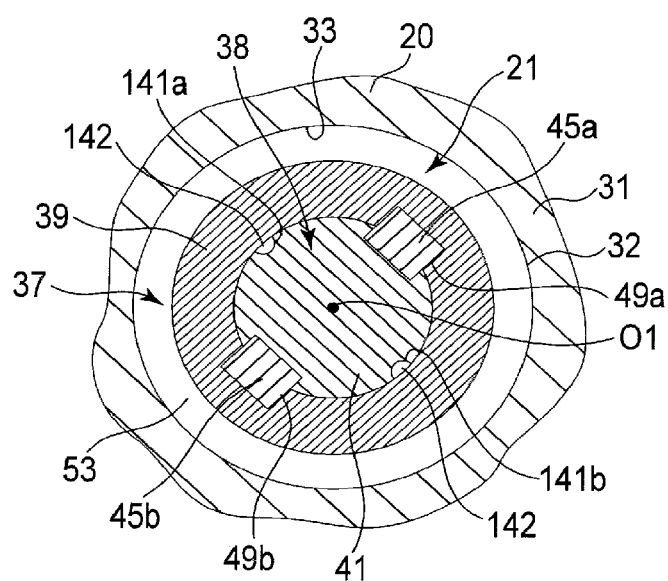
FIG. 30 is a sectional view of a second extruder according to a seventh embodiment.

FIG. 30 shows a seventh embodiment. The seventh embodiment differs from the sixth embodiment in the structure for imparting extension action to raw materials. The other structures of a screw 21 are basically the same as those of the sixth embodiment.

As shown in FIG. 30, a pair of grooves 141a and 141b are formed in the outer circumferential surface of a second axial portion 41 of an axis of rotation 38. The grooves 141a and 141b extend in the axial direction of the second axial portion 41, and are remote from each other in the radial direction of the second axial portion 41. Moreover, the grooves 141a and 141b are opened in the outer circumferential surface of the second axial portion 41.

When a tube 39 is inserted on the second axial portion 41 of the axis of rotation 38, opening ends of the grooves 141a and 141b are closed by the inner circumferential surface of the tube 39. Thus, the grooves 141a and 141b define paths 142 which impart extension action to raw materials in cooperation with the inner circumferential surface of the tube 39. In the present embodiment, the paths 142 are positioned at a boundary between the axis of rotation 38 and the tube 39.

According to the seventh embodiment, the paths 142 are provided at positions eccentric to an axial line O1 of the axis of rotation 38 inside a screw main body 37. Accordingly, as in the sixth embodiment, the paths 142 are shifted from the axial line O1, and revolve around the axial line O1 when the screw main body 37 rotates.

In the seventh embodiment, the paths 142 are formed inside the screw main body 37 when the tube 39 is inserted on the second axial portion 41 of the axis of rotation 38. Since the grooves 141a and 141b defining the paths 142 are opened in the outer circumferential surface of the axis of rotation 38, the grooves 141a and 141b can be easily formed.

Therefore, for example, even if it becomes necessary to change the sectional shape of the paths 142, it can be easily changed.

Eighth Embodiment

FIG. 31 shows an eighth embodiment. The eighth embodiment differs from the first embodiment in the structure for imparting extension action to raw materials. The other structures of a screw 21 are basically the same as those of the first embodiment.

As shown in FIG. 31, depressions 151a and 151b are formed in the tip surfaces of keys 45a and 45b projecting from the outer circumferential surface of a second axial portion 41. The depressions 151a and 151b extend in the axial direction of the second axial portion 41, and are opened in the tip surfaces of the keys 45a and 45b. When the keys 45a and 45b are fitted into keyways 49a and 49b of a tube 39, opening ends of the depressions 151a and 151b are closed by the inner peripheral surfaces of the keyways 49a and 49b.

Thus, the depressions 151a and 151b define paths 152 which impart extension action to raw materials in cooperation with the inner peripheral surfaces of the keyways 49a and 49b. In the present embodiment, the paths 152 are positioned at boundaries between the keys 45a and 45b and the tube 39.

According to the eighth embodiment, the paths 152 are provided at positions eccentric to an axial line O1 of an axis of rotation 38 inside a screw main body 37. Accordingly, as in the first embodiment, the paths 152 are shifted from the axial line O1, and revolve around the axial line O1 when the screw main body 37 rotates.

In the eighth embodiment, the paths 152 are formed inside the screw main body 37, when the keys 45a and 45b of the axis of rotation 38 are fitted into the keyways 49a and 49b of the tube 39. Since the depressions 151a and 151b defining the paths 152 are opened in the tip surfaces of the keys 45a and 45b, the depressions 151a and 151b can be easily formed.

Therefore, for example, even if it becomes necessary to change the sectional shape of the paths 152, it can be easily changed.

In the eighth embodiment, the paths 152 may be defined by providing other depressions extending in the axial direction of the second axial portion 41 in the inner circumferential surfaces of the keyways 49a and 49b, and fitting the other depressions to the depressions 151a and 151b.

Ninth Embodiment

FIG. 32 shows a ninth embodiment. The ninth embodiment differs from the first embodiment in the structure of a screw 21 and the structure for imparting extension action to raw materials.

As shown in FIG. 32, the screw 21 comprises a solid screw main body 161. The screw main body 161 is composed of a straight axial member 162. The axial member 162 has an axial line O1 coaxially penetrating its central portion, and is coaxially accommodated in a cylinder portion 33 of a barrel 20.

Moreover, the axial member 162 comprises an outer circumferential surface 162a continuing in the circumferential direction, and the outer circumferential surface 162a faces the inner circumferential surface of the cylinder portion 33 of the barrel 20. A flight (not shown in the figure) conveying raw materials is formed on the outer circumferential surface 162a of the axial member 162.

Moreover, a pair of paths 164 imparting extension action to raw materials is formed inside the axial member 162. The paths 164 extend in the axial direction of the axial member 162, and are disposed to be parallel to each other with the axial line O1 sandwiched therebetween. Therefore, the paths 164 are provided at positions eccentric to the axial line O1 of the axial member 162 inside the screw main body 161. Accordingly, as in the first embodiment, the paths 164 are shifted from the axial line O1, and revolve around the axial line O1 when the screw main body 161 rotates.

The paths 164 imparting extension action to raw materials can be formed inside the screw main body 161 even if the screw main body 161 is composed of the rodlike member 162. Therefore, the screw main body is not limited to a combination of an axis of rotation and a tube.

Other Embodiments

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiment described herein may be made without departing from the spirit of the invention.

For example, the sectional shape of a path imparting extension action to raw materials is not limited to a circular hole. The path may be composed of, for example, a hole having an elliptical or polygonal sectional shape, and the sectional shape of the path is not particularly limited.

In addition, in each of the above-described embodiments, the case where the screw 21 rotates left-handed in an anticlockwise direction when the screw main body is viewed from the direction of the basal end of the axis of rotation 38 has been described as example. The present invention, however, is not limited to this. For example, the screw 21 may be rotated right-handed in a clockwise direction from the perspective of the basal end side of the screw 21.

In this case, for example, in the first embodiment, it suffices that the flights 56 of the conveyance portions 54 of the screw 21 are twisted right-handed as in the case of a right-handed screw to convey raw materials from the tip toward the basal end of the screw main body 37. Similarly, it suffices that the flights 57 of the barrier portions 55 are twisted left-handed as in the case of a left-handed screw to convey raw materials from the basal end toward the tip of the screw main body 37.

Moreover, the barrier portions of the screw main body are not restricted to being composed of spirally twisted flights. For example, the barrier portions may be composed of annular major diameter portions having outer circumferential surfaces continuing in the circumferential direction of the screw main body. It is preferable that the major diameter portions have widths in the axial direction of the screw main body, and have smooth annular shapes without depressions, cutouts, etc., in their outer circumferential surfaces.

In addition, the third extruder 4 which removes gaseous components included in kneaded materials extruded from the second extruder 3 is not limited to a single screw extruder, and may be a twin screw extruder. If the third extruder 4 is formed as a twin screw extruder, it suffices that two vented screws 23 identical to the vented screw 23 shown in FIG. 4 are arranged in parallel, and the respective flights 29 are engaged with each other in a state of being out of phase by 90°. Surface renewal of kneaded materials can be promoted by rotating the two screws 23 in the same direction. Thus, the efficiency of drawing and removal of gaseous components included in the kneaded materials can be improved. The kneaded materials, from which gaseous components are drawn and removed, are continuously discharged from the discharge port 28 of the head portion 27 to the outside of the high shearing processing apparatus 1.

It suffices that the continuous high shearing processing apparatus according to the present invention comprises at least a first extruder preliminarily kneading raw materials and a second extruder thoroughly kneading the raw materials. A third extruder removing gaseous materials and other volatile components may be omitted. If the third extruder is omitted, it is preferable that at least one vent-port removing gaseous materials and volatile components from raw materials in the process of being kneaded be provided in a middle portion of the second extruder.

Moreover, as the first extruder (processor) 2, not only the above-described twin screw kneader (see FIG. 2 and FIG. 3) and single screw extruder (see FIG. 28), but also various kneaders, for example, a multi-screw extruder, a Banbury mixer, a kneader, and an open roll can be used.

REFERENCE SIGNS LIST

2: First extruder (processor)
3: Second extruder
4: Third extruder (deaerator)
20: Barrel
21: Screw
34: Supply port
36a: Discharge port
37, 161: Screw main body
54, 81, 101: Conveyance portion
56, 57, 58, 84, 86, 105, 107, 110, 111, 112, 122: Flight
60, 88, 115, 132, 142, 152, 164: Path
O1, O2: Axial line

What is claimed is:

1. A kneading method comprising:
continuously melting and mixing materials in a processor to form melted materials; and
using the melted materials as raw materials and continuously discharging kneaded materials produced by kneading the raw materials with a screw in an extruder, wherein
the screw comprises a screw main body configured to rotate on a straight axial line in a conveyance direction of the raw materials such that tubes are coaxially joined to an axis of rotation whereby each of the tubes and the axis of the rotation are integrally assembled to form the screw,
in the screw main body, a conveyance portion configured to convey the raw materials, a barrier portion configured to limit conveyance of the raw materials, and a plurality of paths through which raw materials flow are provided at places in a direction of the axial line, and the plurality of paths are arranged in a circumferential direction of the screw main body at intervals,
each of the plurality of paths is provided inside each respective one of the tubes, and each of the plurality of paths comprises an entrance, an exit, and path main body communicating between the entrance and the exit,
the entrance is opened in an outer circumferential surface of the tube in the conveyance portion to cause the raw materials, the conveyance of which is limited by the barrier portion to increase pressure on the raw materials, to flow in the entrance,
each of plurality of paths is respectively configured to allow the raw materials to flow in from the entrance, pass through the path main body, and flow out of the exit,
the exit is opened in the outer circumferential surface of the tube at a position remote from the entrance in a direction of the axial line,
in the extruder, the raw materials conveyed along an outer circumferential surface of the screw main body flow through the paths and then return to an outer circumferential surface of the screw, while the kneaded materials are continuously discharged,
conveyance of the raw materials conveyed along the outer circumferential surface of the screw main body is limited by the barrier portion provided on the screw main body to increase pressure on the raw materials, and
the raw materials, the pressure on which is increased by the barrier portion, are made to flow into the paths from the outer circumferential surface of the screw main body.

2. The kneading method of claim 1, wherein in a deaerator connected to the extruder, a gaseous component is drawn and removed from the kneaded materials and continuously discharged from the extruder.

* * * * *